US008398091B2

(12) United States Patent
Inoue et al.

(10) Patent No.: US 8,398,091 B2
(45) Date of Patent: Mar. 19, 2013

(54) SUSPENSION SYSTEM FOR VEHICLE

(75) Inventors: Hirofumi Inoue, Toyota (JP); Takuhiro Kondo, Kani (JP)

(73) Assignees: Toyota Jidosha Kabushiki Kaisha, Toyota-shi (JP); Kayaba Industry Co., Ltd., Tokyo (JP)

( * ) Notice: Subject to any disclaimer, the term of this patent is extended or adjusted under 35 U.S.C. 154(b) by 237 days.

(21) Appl. No.: 12/935,703

(22) PCT Filed: May 8, 2009

(86) PCT No.: PCT/JP2009/059027
§ 371 (c)(1), (2), (4) Date: Sep. 30, 2010

(87) PCT Pub. No.: WO2009/139451
PCT Pub. Date: Nov. 19, 2009

(65) Prior Publication Data

US 2011/0025000 A1 Feb. 3, 2011

(30) Foreign Application Priority Data

May 15, 2008 (JP) ................................. 2008-127910

(51) Int. Cl.
*B60G 17/0165* (2006.01)

(52) U.S. Cl. ............... 280/5.507; 280/5.5; 280/124.141; 280/124.165; 280/124.168; 188/266.1; 188/266.3; 267/64.11

(58) Field of Classification Search ................... 280/5.5, 280/5.507, 5.515, 124.134, 124.135, 124.141, 280/124.145, 124.146, 124.154, 124.165, 280/124.168, 124.179; 188/266.1, 266.3; 267/2, 64.11
See application file for complete search history.

(56) References Cited

U.S. PATENT DOCUMENTS 4,743,000 A 5/1988 Karnopp
(Continued)

FOREIGN PATENT DOCUMENTS

CN 1522881 A 8/2004
EP 0 197 317 8/1990
(Continued)

OTHER PUBLICATIONS

International Search Report issued Aug. 13, 2009 in PCT/JP09/059027 filed May 8, 2009.

(Continued)

*Primary Examiner* — Paul N Dickson
*Assistant Examiner* — James English
(74) *Attorney, Agent, or Firm* — Oblon, Spivak, McClelland, Maier & Neustadt, L.L.P.

(57) ABSTRACT

A suspension system for a vehicle, including: an electromagnetic actuator configured to generate an actuator force and including a sprung-side unit supported by a sprung portion, an unsprung-side unit supported by an unsprung portion, a screw mechanism, and an electromagnetic motor; a connecting mechanism including a support spring for permitting one of the sprung-side and unsprung-side units to be floatingly supported as a floating unit by a unit-floatingly support portion that is one of the sprung and unsprung portions by which the floating unit is supported; and a controller including a sprung-vibration-damping control portion and a relative-vibration-damping control portion that is configured to execute a relative-vibration damping control for damping a vibration of the floating unit caused by the structure in which the floating unit is floatingly supported by the support spring.

14 Claims, 19 Drawing Sheets

U.S. PATENT DOCUMENTS

| | | | |
|---|---|---|---|
| 4,936,423 | A | 6/1990 | Karnopp |
| 5,024,302 | A | 6/1991 | Karnopp |
| 5,060,959 | A | 10/1991 | Davis et al. |
| 5,276,622 | A | 1/1994 | Miller et al. |
| 5,497,324 | A | 3/1996 | Henry et al. |
| 5,697,634 | A * | 12/1997 | Kamimae et al. ...... 280/124.108 |
| 8,103,408 | B2 * | 1/2012 | Inoue et al. ..................... 701/37 |
| 2004/0154886 | A1 | 8/2004 | Hio et al. |
| 2005/0038584 | A1 * | 2/2005 | Kim ................................ 701/37 |
| 2008/0009992 | A1 * | 1/2008 | Izawa et al. ..................... 701/37 |
| 2008/0164111 | A1 | 7/2008 | Inoue et al. |

FOREIGN PATENT DOCUMENTS

| | | |
|---|---|---|
| EP | 0 197 316 | 4/1992 |
| EP | 0 270 893 | 6/1992 |
| EP | 0 539 063 | 4/1993 |
| EP | 1 445 132 | 8/2004 |
| EP | 1 829 718 | 9/2007 |
| EP | 2 070 739 | 6/2009 |
| JP | 10-7033 | 1/1998 |
| JP | 2004 237825 | 8/2004 |
| JP | 2007-203933 | 8/2007 |
| WO | 02 08001 | 1/2002 |

OTHER PUBLICATIONS

Japanese Office Action Issued Nov. 1, 2011, in Patent Application No. 2008-127910 (with English-language translation).

* cited by examiner 176
174
172
186
178
188
194
12
170
20
190
172
186
178
20
190
194
12
188
184
182
180
196
172
186
20
190
188
194
12
178
192
172
186
20
194
178
190
188
12

SUSPENSION SYSTEM FOR VEHICLE

TECHNICAL FIELD

The present invention relates in general to a suspension system mounted on a vehicle, and more particularly to a suspension system for a vehicle including an electromagnetic actuator for vibration damping.

BACKGROUND ART

As a suspension system including an electromagnetic actuator functioning as a shock absorber, namely, as the so-called electromagnetic suspension system, there is known one described in the following Patent Document 1, for instance. The electromagnetic suspension system has an advantage that a vibration of a sprung portion can be effectively damped based on a skyhook damper theory, and has been actively developed in the field of vehicles. At present, various proposals with regard to the control of the actuator have been made. In an electromagnetic suspension system described in the following Patent Document 2, there has been developed a control for compensating for an internal inertial force of the actuator.

Patent Document 1 WO 02/08001 A1
Patent Document 2 JP-A-2004-237825

DISCLOSURE OF THE INVENTION

(A) Summary of the Invention

For instance, there exists an electromagnetic actuator employed in the electromagnetic suspension system. The electromagnetic actuator includes: (A) a sprung-side unit connected to a sprung portion: (B) an unsprung-side unit which is connected to an unsprung portion and which moves relative to the sprung-side unit in association with a relative movement of the sprung portion and the unsprung portion toward and away from each other; (C) a screw mechanism including a threaded rod and a nut which are screwed with each other and one of which is provided on the sprung-side unit while the other of which is provided on the unsprung-side unit, such that the threaded rod and the nut rotate relative to each other in association with a relative movement of the sprung-side unit and the unsprung-side unit; and (D) an electromagnetic motor configured to give, to one of the threaded rod and the nut, a force with respect to relative rotation of the threaded rod and the nut. The actuator is configured to generate, based on the force of the electromagnetic motor, an actuator force that is a force with respect to the relative movement of the sprung-side unit and the unsprung-side unit.

In some instances, the electromagnetic suspension system further includes a connecting mechanism having a special structure, for mitigating a shock or impact to be applied from the unsprung portion to the actuator, for instance. The connecting mechanism includes a support spring configured to permit one of the sprung-side unit and the unsprung-side unit to be supported by one of the sprung portion and the unsprung portion to which the one of the sprung-side unit and the unsprung-side unit is connected. The connecting mechanism is configured to connect, owing an elastic force of the support spring, the one of the sprung-side unit and the unsprung-side unit and the one of the sprung portion and the unsprung portion while permitting a relative movement of the one of the sprung-side unit and the unsprung-side unit and the one of the sprung portion and the unsprung portion. That is, the connecting mechanism is configured for floatingly supporting the one of the sprung-side unit and the unsprung-side unit by the spring.

However, in the electromagnetic suspension system having the above-indicated connecting mechanism, the one of the sprung-side unit and the unsprung-side unit vibrates due to the inertial force of the one of the sprung-side unit and the unsprung-side unit and due to the structure in which one of the sprung-side unit and the unsprung-side unit is elastically supported. The vibration may deteriorate the riding comfort of the vehicle and interfere with the steering stability of the vehicle, for instance. Accordingly, by suppressing or restraining the vibration, the utility of the electromagnetic suspension system can be improved. The invention has been developed in the light of the situations described above. It is therefore an object of the invention to improve the utility of the electromagnetic suspension system having the connecting mechanism indicated above.

To achieve the object indicated above, the present invention provides a suspension system for a vehicle in which one of the sprung-side unit and the unsprung-side unit of the electromagnetic actuator is elastically supported by one of the sprung portion and the unsprung portion and which is configured to execute, in the control of the actuator, a control for damping a vibration of the one of the sprung-side unit and the unsprung-side unit that is caused due to the structure in which the one of the sprung-side unit and the unsprung-side unit is elastically supported by the one of the sprung portion and the unsprung portion.

According to the present suspension system, the vibration of the one of the sprung-side unit and the unsprung-side unit can be effectively suppressed, whereby the riding comfort of the vehicle, the steering stability of the vehicle, etc., can be improved. Therefore, the present invention ensures enhanced utility in the suspension system in which the actuator is supported by the one of the sprung portion and the unsprung portion by the support spring.

(B) Forms of Claimable Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

The following forms (1)-(18) correspond to non-limiting aspects, respectively.

(1) A suspension system for a vehicle, comprising:

an electromagnetic actuator including: (A) a sprung-side unit connected to a sprung portion; (B) an unsprung-side unit which is connected to an unsprung portion and which moves relative to the sprung-side unit in association with a relative movement of the sprung portion and the unsprung portion toward and away from each other; (C) a screw mechanism including a threaded rod and a nut which are screwed with each other and one of which is provided on the sprung-side unit while the other of which is provided on the unsprung-side unit, such that the threaded rod and the nut rotate relative to each other in accordance with a relative movement of the sprung-side unit and the unsprung-side unit; (D) an electromagnetic motor configured to give, one of the threaded rod and the nut, a force with respect to relative rotation of the threaded rod and the nut, the actuator being configured to generate, based on the force of the electromagnetic motor, an actuator force that is a force with respect to the relative movement of the sprung-side unit and the unsprung-side unit;

a connecting mechanism which includes a support spring for permitting one of the sprung-side unit and the unsprung-side unit to be supported by one of the sprung portion and the unsprung portion to which said one of the sprung-side unit and the unsprung-side unit is connected, the connecting mechanism being configured to connect, owing to an elastic force of the support spring, said one of the sprung-side unit and the unsprung-side unit and said one of the sprung portion and the unsprung portion to each other while permitting a relative movement of said one of the sprung-side unit and the unsprung-side unit and said one of the sprung portion and the unsprung portion; and a controller configured to control the actuator force of the actuator by controlling an operation of the electromagnetic motor, wherein the controller includes:

a sprung-vibration-damping control portion configured to execute a sprung-vibration damping control for generating, as one component of the actuator force, a force having a magnitude in accordance with a moving speed of the sprung portion, so as to damp a vibration of the sprung portion; and a relative-vibration-damping control portion configured to execute a relative-vibration damping control for generating, as one component of the actuator force, a force having a magnitude in accordance with one of (a) a relative moving speed of the sprung-side unit and the unsprung-side unit; and (b) a relative moving speed of said one of the sprung-side unit and the unsprung-side unit and said one of the sprung portion and the unsprung portion, so as to damp a vibration of said one of the sprung-side unit and the unsprung-side unit that is caused by the support spring.

The suspension system according to the above form (1) has the above-indicated structure in which one of the sprung-side unit and the unsprung-side unit of the electromagnetic actuator is elastically supported by one of the sprung portion and the unsprung portion and the suspension system is configured to execute, in the control of the actuator, a control for damping the vibration of the one of the sprung-side unit and the unsprung-side unit caused due to the above-indicated elastically supported structure. According to the form (1), the vibration of the one of the sprung-side unit and the unsprung-side unit can be effectively restrained, whereby the riding comfort of the vehicle, the steering stability of the vehicle, etc., can be improved. That is, the utility is improved in the suspension system having the structure in which the actuator is supported by the one of the sprung portion and the unsprung portion through the support spring.

The "electromagnetic actuator" in the above form (1) is not particularly limited in terms of its structure, but any electromagnetic actuator that is capable of functioning as the so-called electromagnetic shock absorber may be employed. It is possible to employ electromagnetic actuators with a known structure that employs the screw mechanism. The "screw mechanism" may be configured such that any one of the threaded rod and the nut is made rotatable, and the actuator may be configured such that the electromagnetic motor gives a rotational force to one of the threaded rod and the nut that is made rotatable. Each of the sprung-side unit and the unsprung-side unit may be configured to include, as its constituent element, one of the threaded rod and the nut that is provided thereon.

In the above form (1), the "one of the sprung-side unit and the unsprung-side unit" of the actuator is floatingly supported by "one of the sprung portion and the unsprung portion" by means of the connecting mechanism having the support spring indicated above. In the interest of brevity, the one of the sprung-side unit and the unsprung-side unit will be hereinafter referred to as a "floating unit" while the other of the sprung-side unit and the unsprung-side unit will be hereinafter referred to as a "fixed unit". Further, the one of the sprung portion and the unsprung portion to which is connected the floating unit will be hereinafter referred to as a "unit-floatingly support portion" while the other of the sprung portion and the unsprung portion to which is connected the fixed unit will be hereinafter referred to as a "unit fixation portion".

The "sprung-vibration-damping control portion" of the controller is a functional portion thereof that executes the above-indicated "sprung-vibration damping control" which is based on the so-called skyhook damper theory. Specifically, the sprung-vibration-damping control portion may be configured to control the electromagnetic motor such that the actuator force becomes equal to a force obtained as a product of a control gain corresponding to a damping coefficient of a hook damper to be realized and a moving speed of the sprung portion, namely, an absolute speed of the sprung portion (sprung absolute speed). Where the sprung-vibration damping control is executed for damping, as a main target, a vibration at and around a resonance frequency of the sprung portion (sprung resonance frequency), in particular, the riding comfort of the vehicle becomes particularly good.

The floating unit has an inertial mass and is elastically supported in a floating fashion by the unit-floatingly support portion by means of the support spring of the connecting mechanism. Accordingly, the floating unit vibrates relative to the unit-floatingly support portion. In other words, a relative vibration of the floating unit and the unit-floatingly support portion occurs. Broadly, the vibration can be considered as a vibration of the floating unit relative to the unit-fixation portion, namely, a relative vibration of the floating unit and the fixed unit. If such a vibration of the floating unit is transmitted to the sprung portion, the vehicle driver feels the vibration, and the riding comfort of the vehicle is deteriorated. Further, the vibration acts as a vibration of the unsprung portion to cause a fluctuation in a load that the wheel gives to the ground, and the steering stability of the vehicle is deteriorated. The arrangement according to the form (1) aims at damping the vibration of the floating unit caused by the support spring in an attempt to suppress such phenomena.

In the actuator, a rotary body that rotates in accordance with the relative movement of the sprung-side unit and the unsprung-side unit is constituted by one of the threaded rod and the nut that is made rotatable, a rotor of the electromagnetic motor, a rotational shaft of the motor, and so on. Accordingly, the above-indicated inertial mass of the floating unit is interpreted as including not only an inertial mass with respect to the relative movement of the floating unit and the unit-floatingly support portion, namely, an inertial mass in the narrow sense, but also inertial moment of the rotary body, strictly, a converted mass obtained by converting the inertial moment into the inertial mass with respect to the relative movement. Depending upon the structure of the actuator, the converted mass of the inertial moment exceeds the inertial mass in the narrow sense.

A functional portion of the controller for damping the above-indicated vibration of the floating unit corresponds to the "relative-vibration-damping control portion". The "relative-vibration damping control" executed by the relative-vibration-damping control portion is a control for damping the vibration of the floating unit caused by the support spring, by damping the above-indicated relative vibration of the floating unit and the unit-floatingly support portion or the relative vibration of the floating unit and the fixed unit. In other words, there is executed a control that depends on a theoretical model in which a damper having a suitable damping coefficient is disposed between the floating unit and the unit-floatingly support portion or between the floating unit and the fixation unit. To be more specific, the actuator may be controlled to generate a force corresponding to a force to be generated by the damper. That is, the relative-vibration-damping control portion may be configured to control the electromagnetic motor so as to generate the actuator force obtained as a product of a control gain corresponding to the damping coefficient of the damper and the relative moving speed of the floating unit and the unit-floatingly support portion or the relative moving speed of the floating unit and the fixed unit.

(2) The suspension system according to the form (1), wherein the relative-vibration-damping control portion is configured to execute, as the relative-vibration damping control, a control for generating a force having a magnitude in accordance with the relative moving speed of said one of the sprung-side unit and the unsprung-side unit and said one of the sprung portion and the unsprung portion.

In the above form (2), the vibration of the floating unit is damped by damping the relative vibration of the floating unit and the unit-floatingly support portion. Since the support spring is disposed between the floating unit and the unit-floatingly support portion, the vibration of the floating unit caused by the support spring can be effectively damped according to the form (2).

(3) The suspension system according to the form (2), wherein the relative-vibration-damping control portion is configured to generate the force having a magnitude in accordance with the relative moving speed of said one of the sprung-side unit and the unsprung-side unit and said one of the sprung portion and the unsprung portion, on the basis of a rotational speed of the electromagnetic motor and a relative moving speed of the sprung portion and the unsprung portion.

The above form (3) is a more concrete form for damping the relative vibration of the floating unit and the unit-floatingly support portion. In the above form (3), there is executed a control that is indirectly based on the relative moving speed of the floating unit and the unit-floatingly support portion by utilizing the relative moving speed of the floating unit and the fixed unit and the relative moving speed of the unit-floatingly support portion and the unit fixation portion, without directly using the relative moving speed of the floating unit and the unit-floatingly support portion.

The rotational amount of the electromagnetic motor corresponds to the relative movement amount of the sprung-side unit and the unsprung-side unit. In the control of the electromagnetic motor, the rotational amount thereof is usually detected. In the meantime, most of the electromagnetic suspension systems include a sensor for measuring a distance between the sprung portion and the unsprung portion (hereinafter referred to as "sprung-unsprung distance" where appropriate), namely, a stroke sensor. According to the form (3), the relative-vibration damping control can be easily executed without providing any additional sensors.

(4) The suspension system according to the form (1), wherein the relative-vibration-damping control portion is configured to execute, as the relative-vibration damping control, a control for generating a force having a magnitude in accordance with the relative moving speed of the sprung-side unit and the unsprung-side unit.

In the above form (4), the vibration of the floating unit is damped by damping the relative vibration of the floating unit and the fixed unit. While the support spring is disposed between the floating unit and the unit-floatingly support portion, the vibration of the floating unit caused by the support spring can be considered as the relative vibration of the floating unit and the fixed unit. Therefore, the vibration of the floating unit can be easily damped according to the form (4).

(5) The suspension system according to the form (4), wherein the relative-vibration-damping control portion is configured to generate the force having a magnitude in accordance with the relative moving speed of the sprung-side unit and the unsprung-side unit, on the basis of a rotational speed of the electromagnetic motor.

The above form (5) is a more concrete form for damping the relative vibration of the floating unit and the fixed unit. As explained above, the rotational amount of the electromagnetic motor is usually detected in the control thereof. According to the form (5), the relative-vibration damping control can be executed more easily by simply obtaining the rotational speed of the electromagnetic motor without providing any additional sensors.

(6) The suspension system according to any one of the forms (1)-(5), wherein the relative-vibration-damping control portion is configured to execute, as the relative-vibration damping control, a control for restraining resonance phenomenon of said one of the sprung-side unit and the unsprung-side unit which is caused by the support spring of the connecting mechanism.

In an instance where an inertial-mass body is supported by a spring, resonance phenomenon occurs in a vibration having a natural frequency that depends on the inertial mass of the inertial-mass body and the spring constant of the spring. The vibration at and around the frequency where the resonance phenomenon occurs deteriorates the above-explained riding comfort and the steering stability of the vehicle to a particularly high extent. Accordingly, it is desirable to restrain at least the resonance phenomenon. Conversely, the riding comfort and the steering stability of the vehicle can be effectively improved by suppressing the resonance phenomenon. In the light of the above, the purpose of the relative-vibration damping control is directed, in the form (6), to restraining of the resonance phenomenon of the floating unit. In the form (6), the damping coefficient of the damper in the theoretical model explained above may be set at a suitable value for restraining the resonance phenomenon. In other words, the relative-vibration-damping control portion may be configured to control the electromagnetic motor so as to generate the actuator force which is obtained as a product of the control gain corresponding to the suitable damping coefficient and the relative moving speed of the floating unit and the unit-floatingly support portion or the relative moving speed of the floating unit and the fixed unit.

(7) The suspension system according to any one of the forms (1)-(6), wherein the controller further includes an unsprung-vibration-damping control portion (370) configured to execute an unsprung-vibration damping control for generating, as one component of the actuator force, a force having a magnitude in accordance with a moving speed of the unsprung portion, for damping a vibration of the unsprung portion.

In the above form (7), the "unsprung-vibration damping control" is executable in addition to the above-indicated sprung-vibration damping control as a basic control of the actuator. It is particularly desirable to deal with the vibration of the unsprung portion at and around the resonance frequency of the unsprung portion (unsprung resonance frequency). Where transmission of the vibration of the unsprung portion to the sprung portion is suppressed, the riding comfort of the vehicle becomes good. Further, where the vibration of the unsprung portion is suppressed, the steering stability of the vehicle is improved.

(8) The suspension system according to any one of the forms (1)-(7), wherein the controller further includes a body-posture-change-restraining control portion (202) configured to execute, for restraining at least one of pitch and roll of a body of the vehicle, a body-posture-change restraining control for generating, as one component of the actuator force, a counter force against an acting force that acts on the body of the vehicle as a cause of the at least one of pitch and roll, the counter force having a magnitude in accordance with the acting force.

In the above form (8), the suspension system is provided with a function of restraining roll of the vehicle body which arises from turning of the vehicle and pitch of the vehicle body which arises from acceleration and deceleration of the vehicle, for instance. Where at least one of the roll and the pitch of the vehicle body is restrained by the “body-posture-change restraining control”, the riding comfort of the vehicle becomes much better.

(9) The suspension system according to any one of the forms (1)-(8), wherein the support spring is configured to permit the unsprung-side unit as said one of the sprung-side unit and the unsprung-side unit to be supported by the unsprung portion as said one of the sprung portion and the unsprung portion, wherein the connecting mechanism is configured to connect the unsprung-side unit and the unsprung portion owing to the elastic force of the support spring while permitting a relative movement of the unsprung-side unit and the unsprung portion, and wherein the relative-vibration-damping control portion is configured to execute, as the relative-vibration damping control, a control for generating a force having a magnitude in accordance with one of (a) the relative moving speed of the sprung-side unit and the unsprung-side unit; and (b) a relative moving speed of the unsprung-side unit and the unsprung portion, so as to damp a vibration of the unsprung-side unit.

In the above form (9), the unsprung-side unit functions as the floating unit indicated above while the unsprung portion functions as the unit-floatingly support portion. According to the form (9), the connecting mechanism is disposed between the unsprung portion and the actuator, whereby the impact to be applied from the unsprung portion to the actuator, especially, the impact to be applied to the electromagnetic motor, can be effectively mitigated by the connecting mechanism.

(10) The suspension system according to any one of the forms (1)-(9), further comprising a main spring (256) configured to connect, owing to an elastic force thereof, the sprung portion and unsprung portion.

(11) The suspension system according to any one of the forms (1)-(9), further comprising a connect spring (46) configured to connect, owing to an elastic force thereof, (a) said one of the sprung-side unit and the unsprung-side unit and (b) the other of the sprung portion and the unsprung portion to which the other of the sprung-side unit and the unsprung-side unit is connected.

In the above two forms (10) and (11), there is added a limitation as to a spring that connects the sprung portion and the unsprung portion, namely, a limitation as to the so-called suspension spring. In the former form, the main spring functions as the suspension spring, and the support spring of the connecting mechanism is disposed in parallel with the main spring. In the latter form, the connect spring and the support spring are disposed in series with each other, and the two springs cooperate with each other to function as the suspension spring.

The latter form can be considered as a form in which the floating unit is floatingly supported also by the other of the sprung-side unit and the unsprung-side unit through the connect spring. That is, in the latter form, the above-indicated vibration of the floating unit is generated under the influence of the elastic force of the connect spring.

(12) The suspension system according to any one of the forms (1)-(11), further comprising a hydraulic damper (52) configured to generate a counter force against the relative movement of the sprung portion and the unsprung portion.

(13) The suspension system according to any one of the forms (1)-(12), wherein the connecting mechanism includes a hydraulic damper (290) configured to generate a counter force against the relative movement of said one of the sprung-side unit and the unsprung-side unit and said one of the sprung portion and the unsprung portion.

In each of the above two forms (12) and (13), a hydraulic damper is additionally disposed. In the former form, the hydraulic damper is disposed at a position similar to a position at which a conventional hydraulic shock absorber is disposed. In the latter form, on the contrary, the hydraulic damper is disposed in parallel with the above-indicted support spring.

Because the vibration of the sprung portion is capable of being damped by execution of the above-indicated sprung-vibration damping control, the function of each of the hydraulic dampers in the above two forms can be tailored to deal with the vibration of the unsprung portion, for instance. Accordingly, each damper can be configured to have a damping coefficient suitable for restraining transmission of the vibration of the unsprung portion to the sprung portion or for restraining the vibration of the unsprung portion. Where the damper works to deal with the vibration having a frequency at and around the resonance frequency of the unsprung portion, in particular, the characteristics such as the riding comfort and the steering stability of the vehicle can be effectively improved. The hydraulic damper in the former form can generate certain damping force with respect to the relative vibration of the sprung portion and the unsprung portion even when actuator failure occurs. Accordingly, the former form is superior in terms of fail safe.

In an instance where the actuator is floatingly supported by the support spring, the actuator force acts on the sprung portion and the unsprung portion via the support spring. Accordingly, there exists a certain time lag from a time point at which a command to generate a certain magnitude of the actuator force is issued to a time point at which the actuator force actually acts on the sprung portion and the unsprung portion. In short, the presence of the support spring deteriorates the responsiveness in the control of the actuator to a certain extent. The hydraulic damper in the latter form may be disposed for the purpose of improving the responsiveness.

(14) The suspension system according to any one of the forms (1)-(13), wherein the relative-vibration-damping control portion is configured to execute the relative-vibration damping control only in a situation in which a component of an intensity of the vibration of said one of the sprung-side unit and the unsprung-side unit with respect to a specific frequency is higher than a threshold.

(15) The suspension system according to the form (14), wherein the relative-vibration-damping control portion is configured to execute, as the relative-vibration damping control, a control for restraining resonance phenomenon of said one of the sprung-side unit and the unsprung-side unit which is caused by the support spring of the connecting mechanism and is configured to execute the control only in a situation in which a component of the intensity of the vibration with respect to a resonance frequency in the resonance phenomenon as the specific frequency is higher than the threshold.

Briefly, in the above two forms (14) and (15), the execution of the relative-vibration damping control is limited in connection with the frequency of the vibration of the floating unit. Where the relative-vibration damping control is arranged to be executed only in a situation in which the vibration of the floating unit in the specific frequency range occurs or is noticeable, it is possible to reduce the load relating to the control. For instance, one arrangement of the above two forms corresponds to an arrangement in which the relative-vibration damping control is executed only in a situation in which the vehicle riding comfort, the vehicle steering stability, etc., suffer from a relatively large adverse effect. In the latter form, the execution of the relative-vibration damping control is limited such that the relative-vibration damping control is executed mainly for damping the vibration of the floating unit in the resonance frequency range. Even where the relative-vibration damping control is executed only in the situation in which the vibration in the resonance frequency range occurs or is noticeable as recited in the form, the vehicle riding comfort and the vehicle steering stability can be sufficiently ensured.

The situation in which the specific frequency component of the intensity of the vibration of the floating unit becomes higher than the threshold can be judged from an amplitude, a speed, and so on, of a certain vibration. More specifically, the judgment can be made with respect to the absolute vibration of the floating unit, the relative vibration of the floating unit and the unit-floatingly support portion or the unit fixation portion, for instance. Further, the judgment can be made based on the intensity, namely, the amplitude, the speed, etc, of each of the vibration of the sprung portion or the unsprung portion, the relative vibration of the sprung portion and the unsprung portion, the relative vibration of the sprung-side unit and the unsprung-side unit, etc. Therefore, any of those various vibrations may be selected as a target for judging whether the execution of the relative-vibration damping control is permissible or not. Whether or not the specific frequency component of the intensity of the vibration of the floating unit is higher than the threshold may be judged based on the specific frequency component of the intensity of the vibration selected as the target for judging whether the execution of the relative-vibration damping control is permissible or not, or may be judged based on a component of the intensity of the vibration in a suitable frequency range that includes frequencies around the frequency. For instance, the component value of the intensity of the vibration in the specific frequency range may be obtained or estimated initially by continuously detecting parameters indicative of the state of the vibration such as the moving speed of the floating unit relative to the unit-floatingly support portion or the fixed unit, the rotational speed of the electromagnetic motor, and the relative moving speed of the sprung-side unit and the unsprung-side unit, and then by performing filtering processing on the detection result. On the basis of the thus obtained or estimated value, it may be judged whether the execution of the relative-vibration damping control is permissible or not.

(16) The suspension system according to any one of the forms (1)-(15), further comprising a relative-displacement limiting mechanism (150; 314) configured to limit a relative displacement of said one of the sprung-side unit and the unsprung-side unit and said one of the sprung portion and the unsprung portion in the relative movement thereof.

If a movable range over which the floating unit is movable relative to the unit-floatingly support portion is made large, the connecting mechanism tends to be large-sized, for instance. That is, the length of the connecting mechanism as measured in a direction in which the sprung portion and the unsprung portion are connected increases, causing an increase in the size of the suspension system. In the meantime, if the movable range is made large by decreasing the spring constant of the support spring, there may be a possibility that the actuator force does not act on the sprung portion and unsprung portion with appropriate responsiveness. In the light of the above, the movable range of the floating unit is desirably limited to a certain extent. The above form (16) is based on such a demand. The structure of the "relative-displacement limiting mechanism" is not particularly limited. For instance, the relative-displacement limiting mechanism may be realized by providing a stopper for prohibiting a movement of the floating unit by an abutting contact of a part of the floating unit with the stopper.

(17) The suspension system according to the form (16), wherein the relative-vibration-damping control portion is configured such that a control gain set for the force to be generated by the actuator in the relative-vibration damping control is made larger in an instance where an amount of the relative displacement of said one of the sprung-side unit and the unsprung-side unit and said one of the sprung portion and the unsprung portion in the relative movement thereof exceeds a threshold than an instance where the amount of the relative displacement does not exceed the threshold.

(18) The suspension system according to the form (16) or (17), wherein the relative-vibration-damping control portion is configured such that a control gain set for the force to be generated by the actuator in the relative-vibration damping control increases with an increase in an amount of the relative displacement of said one of the sprung-side unit and the unsprung-side unit and said one of the sprung portion and the unsprung portion in the relative movement thereof.

In an instance where the above-indicated relative-displacement limiting mechanism is provided, the movement of the floating unit is prohibited at one end of its movable range. Where the relative-displacement limiting mechanism includes the stopper described above, there is caused not some little impact due to the stopper that works at one end of the movable range. If the driver feels the impact as the vibration and perceives the impact as the impact sound, the driving comfort may be deteriorated. Thus, the provision of the relative-displacement limiting mechanism may give an adverse effect.

The above two forms (17) and (18) are for decreasing the adverse effect due to the provision of the relative-displacement limiting mechanism. The former form includes an arrangement in which, when the floating unit moves near to one end of the movable range, the actuator force to be generated in the relative-vibration damping control is made large, whereby a relatively large resistance force is given to the movement of the floating unit toward one end of the movable range, for instance. According to the arrangement, the floating unit is prevented from reaching one end or the above-indicated impact generated upon reaching can be made small. The latter form may be arranged such that the actuator force to be generated in the relative-vibration damping control is increased as the floating unit moves closer to one end of the movable range, namely, the actuator force is increased with a decrease in the distance between the floating unit and one end of the movable range. According to the arrangement, the floating unit is prevented from reaching one end or the above-indicated impact generated upon reaching can be made small, as in the former form.

The above two forms may be combined. That is, the actuator force to be generated in the relative-vibration damping control may be increased when the relative-displacement amount of the floating unit and the unit-floatingly support portion exceeds the threshold, and the degree of the increase in the actuator force may be gradually increased as the floating unit moves closer to one end of the movable range.

EMBODIMENTS

Figure 1:
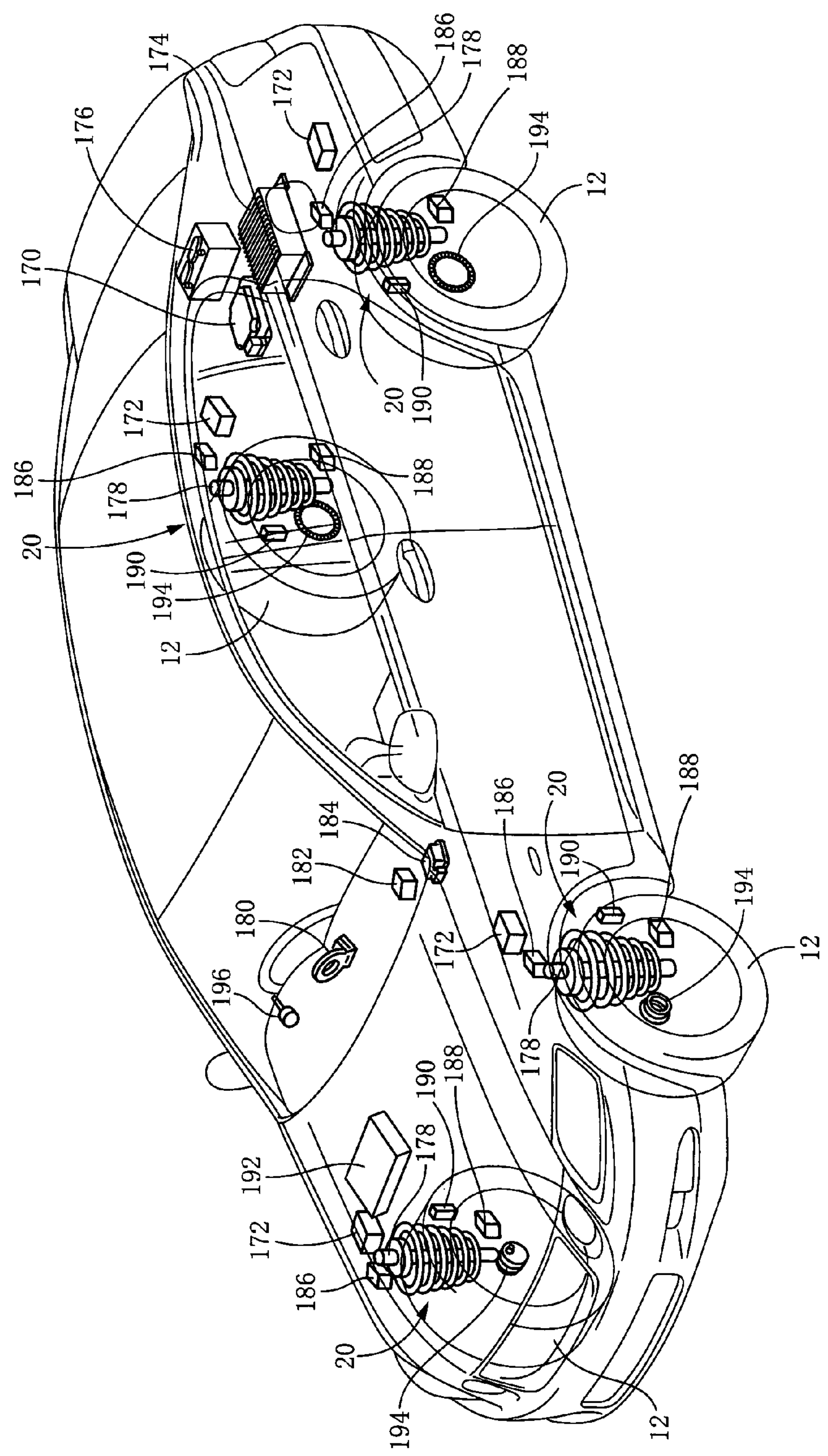
FIG. 1 is a schematic view showing an overall structure of a suspension system for a vehicle according to a first embodiment.

There will be explained in detail embodiments according to the claimable invention, referring to the drawings. It is to be understood, however, that the claimable invention is not limited to the details of the following embodiments but may be embodied with various changes and modifications, such as those described in the FORMS OF THE CLAIMABLE INVENTION, which may occur to those skilled in the art.

1. First Embodiment

(A) Structure of Suspension System

As shown in FIG. 1, a suspension system for a vehicle according to a first embodiment includes four suspension apparatuses 20 provided so as to correspond to respective four wheels 12, i.e., a front left wheel, a front right wheel, a rear left wheel, and a rear right wheel, and a control system that governs a control of the suspension apparatuses 20. Two of the four suspension apparatuses 20 for the respective two front wheels that can be steered are substantially identical in construction with another two of the four suspension apparatuses 20 for the respective two rear wheels that cannot be steered, except for a mechanism that enables the wheels to be steered. Accordingly, the structure of the suspension apparatuses 20 will be explained focusing on one of the two suspension apparatuses 20 for the rear wheels.

i) Structure of Suspension Apparatus

Figure 2:
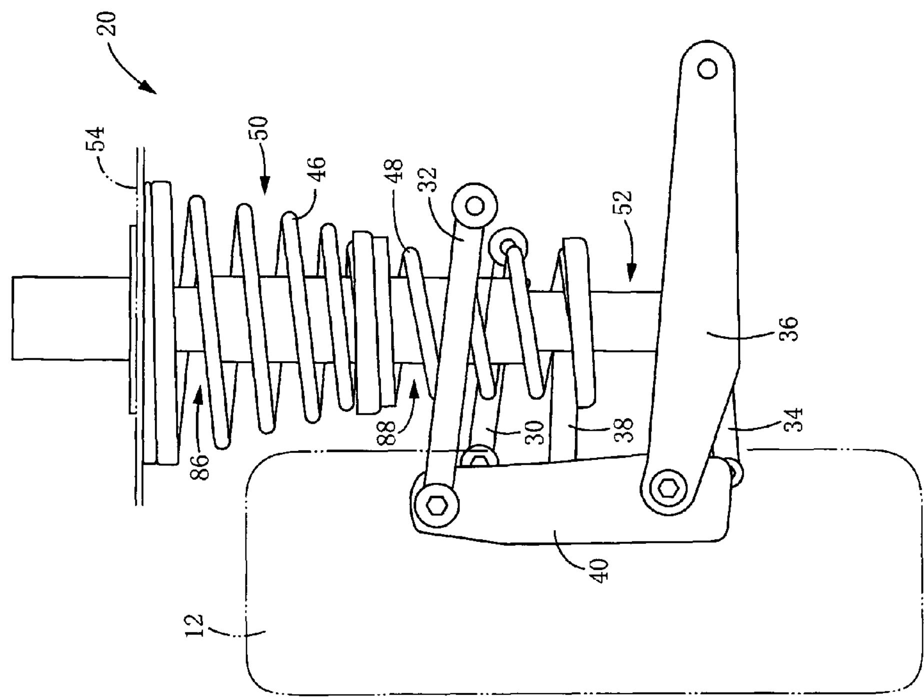
FIG. 2 is a front elevational view showing a suspension apparatus provided for a rear wheel in the suspension system of FIG. 1.

As shown in FIG. 2, each suspension apparatus 20 is of an independent type and a multi link type. The suspension apparatus 20 includes a first upper arm 30, a second upper arm 32, a first lower arm 34, a second lower arm 36, and a toe control arm 38, each as a suspension arm. One end of each of the five arms 30, 32, 34, 36, 38 is rotatably connected to a body of the vehicle while the other end thereof is rotatably connected to an axle carrier 40 which rotatably holds a corresponding one of the four wheels 12. Owing to the five arms 30, 32, 34, 36, 38, the axle carrier 40 is vertically movable relative to the vehicle body along a substantially constant locus.

The suspension apparatus 20 includes: two compression coil springs 46, 48 disposed in series with each other; an electromagnetic actuator 50; and a hydraulic damper 52. The two compression coil springs 46, 48 cooperate with each other to function as a suspension spring for elastically connecting a sprung portion and an unsprung portion. The actuator 50 functions as a shock absorber and is disposed between a mount portion 54 as one constituent element of the sprung portion and the second lower arm 36 as one constituent element of the unsprung portion.

ii) Structure of Electromagnetic Actuator

Figure 3:
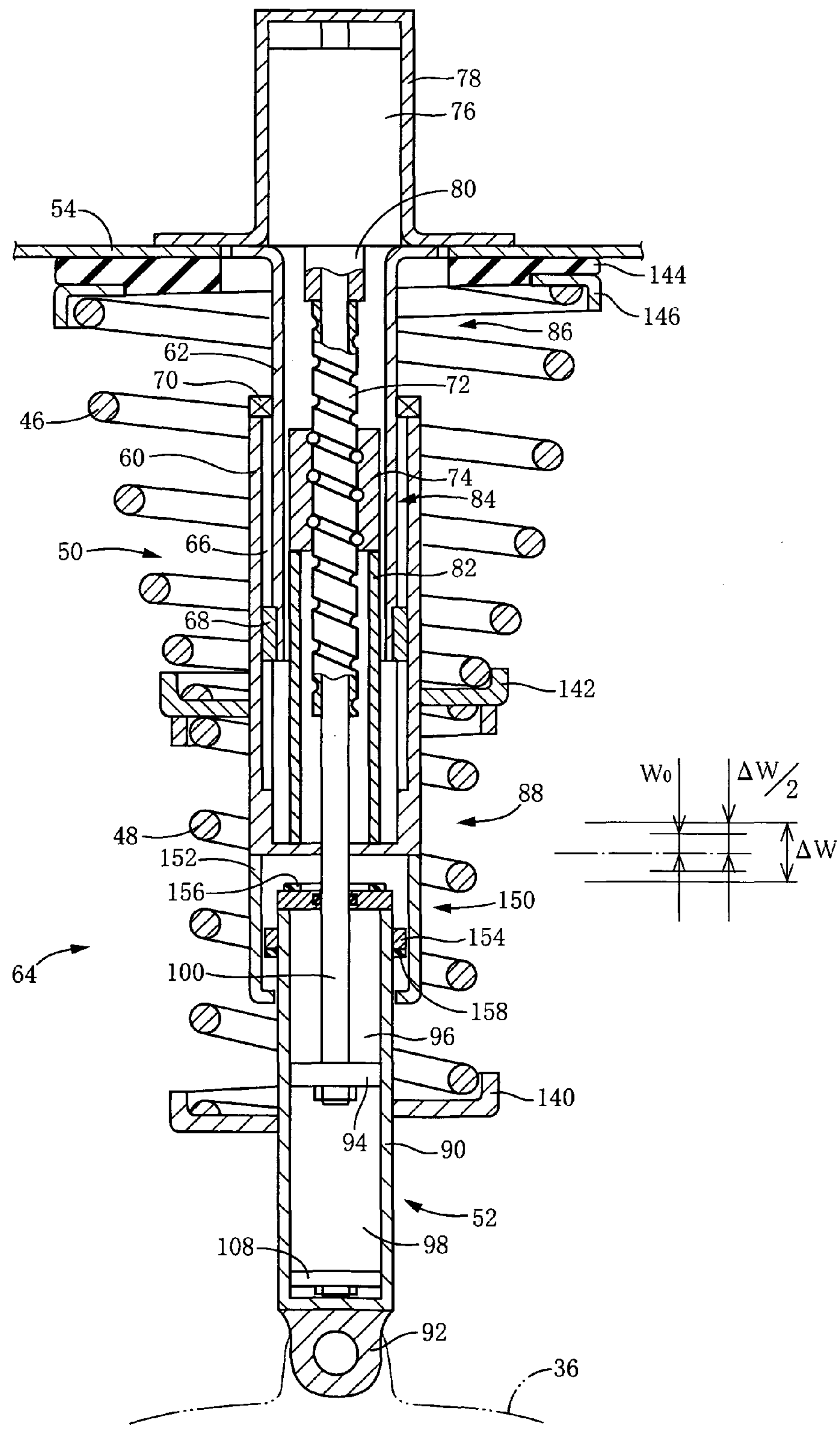
FIG. 3 is a cross sectional view showing a suspension spring, an electromagnetic actuator, and a hydraulic damper which constitute the suspension apparatus of FIG. 2.

As shown in FIG. 3, the actuator 50 of each suspension apparatus 20 includes an outer tube 60 and an inner tube 62 which is fitted in the outer tube 60 so as to protrude upward from an upper end portion of the outer tube 60. As explained later in detail, the outer tube 60 is connected to the second lower arm 36 via a connecting mechanism 64 that includes the compression coil spring 48 as its constituent element while the inner tube 62 is connected at its upper end portion to the mount portion 54.

The outer tube 60 is formed with, on its inner wall surface, a pair of guide grooves 66 that extend in an axis direction of the actuator 50 while the inner tube 62 has a pair of keys 68 attached to its lower end portion. The pair of keys 68 are fitted into the pair of guide grooves 66, whereby the outer tube 60 and the inner tube 62 are allowed to be relatively movable in the axis direction while being unrotatable relative to each other. A dust seal 70 is attached to the upper end portion of the outer tube 60 for preventing entry of dusts, mud, and the like, from an outside.

The actuator 50 includes a hollow, externally threaded rod 72, a nut 74 which holds bearing balls and which are screwed with the threaded rod 72, and an electromagnetic motor 76 (hereinafter simply referred to as "motor 76" where appropriate).

The motor 76 is fixedly housed in a motor casing 78. The motor casing 78 is fixed at its flange portion to an upside of the mount portion 54, whereby the motor casing 78 is fixed to the mount portion 54. To the flange portion of the motor casing 78, the upper end portion of the outer tube 60 having a flange-like shape is fixed. According to the structure, the outer tube 60 is fixedly connected to the mount portion 54.

A motor shaft 80 which is a rotation shaft of the motor 76 is a hollow shaft and is connected integrally to an upper end portion of the threaded rod 72. That is, the threaded rod 72 is disposed in the inner tube 62 so as to continuously extend from the motor shaft 80 and is given a rotational force from the motor 76. A cylindrical support member 82 is fixed to an inner bottom portion of the outer tube 60 such that the threaded rod 72 is accommodated in the cylindrical support member 82, and the nut 74 is fixed to an upper end portion of the cylindrical support member 82. The threaded rod 72 is screwed with the nut 74 which is fixed to the cylindrical support member 82 and cooperates with the nut 74 to constitute a screw mechanism 84.

According to the structure indicated above, the actuator 50 has: a sprung-side unit 86 including the inner tube 62, the motor casing 78, the motor 76, the threaded rod 72, and so on; and an unsprung-side unit 88 including the outer tube 60, the cylindrical support member 82, the nut 74, and so on. The actuator 50 is configured such that the sprung-side unit 86 and the unsprung-side unit 88 are moved relative to each other and the treaded rod 72 and the motor 76 are rotated, in association with a relative movement of the sprung portion and the unsprung portion. Further, the actuator 50 is configured to generate an actuator force that is a force with respect to the relative movement of the sprung-side unit 86 and the unsprung-side unit 88, by a rotational force of the motor 76 that is given to the threaded rod 72. The actuator force acts on the sprung portion and the unsprung portion via the compression coil spring 48.

iii) Structure of Hydraulic Damper

The damper 52 of each suspension apparatus 20 is constituted as a cylinder device and is disposed between the actuator 50 and the second lower arm 36. The damper 52 includes a generally cylindrical housing 90 which is connected to the second lower arm 36 at a joint portion 92 fixedly provided at its lower end. The housing 90 accommodates a working fluid in an inside thereof. A piston 94 is disposed in the inside of the housing 90 such that the inside of the housing 90 is divided into two fluid chambers, namely, an upper fluid chamber 96 and a lower fluid chamber 98. The piston 94 is slidable relative to the housing 90.

The damper 52 has a piston rod 100 connected at its lower end to the piston 94 and extending through a cap portion of the housing 90. The piston rod 100 extends through an opening formed at the bottom of the outer tube 60 and also extends through the threaded rod 72 and the motor shaft 80, so as to be fixed at its upper end to the motor casing 78.

Figure 4:
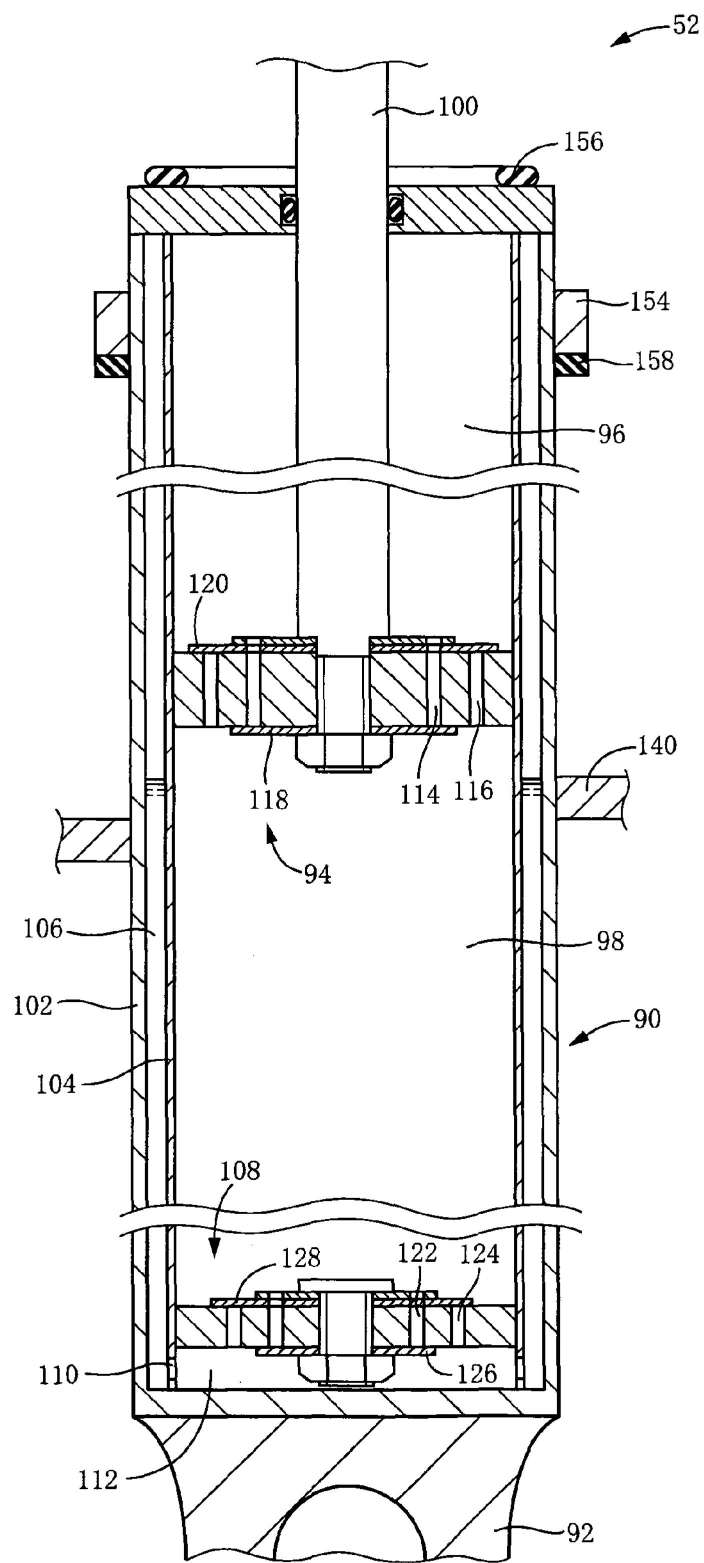
FIG. 4 is an enlarged cross sectional view of a hydraulic damper shown in FIG. 3.

The damper 52 has a structure similar to that of a shock absorber of a twin tube type. The structure of the damper 52 will be explained in detail with reference to FIG. 4. As shown in FIG. 4, the housing 90 of the damper 52 has a twin tube structure comprised of an outer cylindrical member 102 and an inner cylindrical member 104 between which is formed a buffer chamber 106. In the vicinity of an inner bottom portion of the housing 90, a partition wall 108 is provided, and an auxiliary fluid chamber 112 communicating with the buffer chamber 106 via communication holes 110 is formed. In other words, the lower fluid chamber 98 and the buffer chamber 106 are held in communication with each other through the auxiliary fluid chamber 112.

The piston 94 has a plurality of communication passages 114, 116 (two of which are shown in FIG. 4) which are formed through the thickness of the piston 62 so as to extend in the axis direction and through which the upper fluid chamber 96 and the lower fluid chamber 98 communicate with each other. Disk-like valve members 118, 120 each formed of an elastic material are disposed respectively on a lower surface and an upper surface of the piston 94. Openings of the communication passages 114 on the side of the lower fluid chamber 98 are closed by the valve member 118 while openings of the communication passages 116 on the side of the upper fluid chamber 96 are closed by the valve member 120.

Like the piston 94, the partition wall 108 has a plurality of communication passages 122, 124 (two of which are shown in FIG. 4) which are formed through the thickness of the partition wall 108 and through which the lower fluid chamber 98 and the auxiliary chamber 112 communicate with each other. Disk-like valve members 126, 128 each formed of an elastic material are disposed respectively on a lower surface and an upper surface of the partition wall 108. Openings of the communication passages 122 on the side of the auxiliary fluid chamber 112 are closed by the valve member 126 while openings of the communication passages 124 on the side of the lower fluid chamber 98 are closed by the valve member 128.

In the structure described above, when the piston 94 is moved upward within the housing 90, a part of the working fluid in the upper fluid chamber 96 flows into the lower fluid chamber 98 through the communication passages 114 while a part of the working fluid in the buffer chamber 106 flows into the lower fluid chamber 98 through the communication passages 124. On this occasion, a resistance is given to the upward movement of the piston 94 owing to the flows of the working fluid into the lower fluid chamber 98 as a result of deflection of the valve members 118, 128 caused by the working fluid. On the other hand, when the piston 94 is moved downward within the housing 90, a part of the working fluid in the lower fluid chamber 98 flows into the upper fluid chamber 96 through the communication passages 116 while flowing into the buffer chamber 106 through the communication passages 122. On this occasion, a resistance is given to the downward movement of the piston 94 owing to the flows of the working fluid from the lower fluid chamber 98 as a result of deflection of the valve members 120, 126 caused by the working fluid.

According to the structure described above, the damper 52 is configured to permit fluid communication between the upper fluid chamber 96 and the lower fluid chamber 98 and between the lower fluid chamber 98 and the buffer chamber 106, in association with the upward and downward movement of the piston 94 relative to the housing 90 and is configured to include a flow-resistance giving mechanism for giving a resistance to the fluid communication. That is, the damper 52 is configured to generate a resistance force against the relative movement of the sprung portion and the unsprung portion, namely, a damping force with respect to the relative movement.

iv) Structures of Suspension Spring and Connecting Mechanism

A lower spring seat 140 having a flange-like shape is attached to an outer circumferential portion of the housing 90 while an intermediate spring seat 142 having a flange-like shape is attached to an outer circumferential portion of the outer tube 60. The compression coil spring 48 is disposed in a compressed state so as to be sandwiched between the lower spring seat 140 and the intermediate spring seat 142. Further, an upper spring seat 146 is attached to an underside of the mount portion 54 via a vibration damping rubber 144. The compression coil spring 46 is disposed in a compressed state so as to be sandwiched between the intermediate spring seat 142 and the upper spring seat 146.

According to the structure described above, the compression coil spring 46 functions as a connect spring for elastically connecting the sprung portion and the unsprung-side unit 88 while the compression coil spring 48 functions as a support spring that permits the unsprung-side unit 88 to be elastically supported by the unsprung portion. Accordingly, the compression coil spring 46 and the compression coil spring 48 cooperate with each other to function as a suspension spring for elastically connecting the sprung portion and the unsprung portion. Further, the compression coil spring 48 is one constituent element of the connecting mechanism 64 for elastically connecting the unsprung portion and the unsprung-side unit 88.

In other words, in the present suspension apparatus 20, the sprung-side unit 86 of the actuator 50 as a fixed unit is fixedly connected to the sprung portion as a unit fixation portion while the unsprung-side unit 88 of the actuator 50 as a floating unit is floatingly supported by the unsprung portion as a unit-floatingly support portion. In this respect, in the present suspension apparatus 20, the unsprung-side unit 88 is also floatingly supported by the sprung portion through the compression coil spring 46.

The connecting mechanism 64 is configured to allow the movement of the unsprung-side unit 88 relative to the unsprung portion. It is noted that a relative displacement of the unsprung-side unit 88 and the unsprung portion in the relative movement thereof is limited by a relative-displacement limiting mechanism 150 of the connecting mechanism 64. The relative-displacement limiting mechanism 150 is constituted by the bottom portion of the outer tube 60, the upper end portion of the housing 90 of the damper 52, a cylindrical skirt 152 attached to the bottom portion of the outer tube 60, a stopper ring 154 attached to the outer circumferential portion of the housing 90, and so on.

More specifically, when the unsprung-side unit 88 moves toward the unsprung portion, the bottom portion of the outer tube 60 comes into contact with the upper end portion of the housing 90 of the damper 52 via a cushion rubber 156, whereby the movement of the unsprung-side unit 88 toward the unsprung portion is limited. On the other hand, when the unsprung-side unit 88 moves away from the unsprung portion, a lower end portion of the skirt 152 having an inward flange-like shape comes into contact with the stopper ring 154 via a cushion rubber 158, whereby the movement of the unsprung-side unit 88 away from the unsprung portion is limited.

The range of the relative movement limited by the relative-displacement limiting mechanism 150, namely, the range over which the movement of the unsprung-side unit 88 relative to the unsprung portion is allowed (hereinafter referred to as "relative-movement allowable range" where appropriate), is indicted by $\Delta W$ in FIG. 3. In the meantime, the movement of the sprung portion and the unsprung portion toward each other and the movement of the sprung portion and the unsprung portion away from each other (hereinafter collectively referred to as "stroke movement" where appropriate) are limited by limiting the range of a pivotal movement of the second lower arm 36 by means of a bound stopper and a rebound stopper which are not shown. Accordingly, the above-indicated relative-movement allowable range is made smaller than a stroke range over which the stroke movement is allowed.

v) Structure of Control System

As shown in FIG. 1, the suspension system according to the present embodiment has an electronic control unit 170 (hereinafter abbreviated as "ECU 170" where appropriate) as a controller for controlling the operation of each of the four actuators 50, namely, for controlling the actuator force of each actuator 50. The ECU 170 is constituted mainly by a computer equipped with a CPU, a ROM, a RAM, and so on. There are connected, to the ECU 170, four inverters 172 each as a drive circuit of the motor 76 of a corresponding one of the actuators 50. Each inverter 172 is connected to a battery 176 as an electric power source via a converter 174 and is connected to the motor 76 of the corresponding actuator 50. Each motor 76 is a DC brushless motor and is configured to be driven at a constant voltage. The control of the actuator force of each actuator 50 is carried out by controlling an electric current flowing through the motor 76. The electric current flowing through the motor 76 is controlled by changing a ratio (duty ratio) of a pulse-on time to a pulse-off time by Pulse Width Modulation (PWM). The rotational angle $\theta$ of each motor 76 is detected by a corresponding motor-rotational-angle sensor 178, and the inverter 172 is configured to control the operation of the corresponding motor 76 based on the detected motor-rotational angle $\theta$.

The above-indicated four motor-rotational-angle sensors 178 are connected to the ECU 170. To the ECU 170, there are further connected: a steering sensor 180 for detecting an operational angle $\delta$ of a steering wheel as a steering amount; a lateral-acceleration sensor 182 for detecting actual lateral acceleration $G_{YR}$ that is actually generated in the vehicle body; and a longitudinal-acceleration sensor 184 for detecting longitudinal acceleration $G_X$ that is generated in the vehicle body. There are further connected, to the ECU 170, various sensors provided so as to correspond to the respective four suspension apparatuses 20, such as sprung-vertical-acceleration sensors 186 each for detecting sprung acceleration $G_U$ that is vertical acceleration of the sprung portion, unsprung-vertical-acceleration sensors 188 each for detecting unsprung acceleration $G_L$ that is vertical acceleration of the unsprung portion, and stroke sensors 190 each for detecting a stroke amount S that corresponds to a distance between the sprung portion and the unsprung portion (hereinafter referred to as "sprung-unsprung distance" where appropriate).

To the ECU 170, there is further connected a brake electronic control unit 192 (hereinafter referred to as "brake ECU 192" where appropriate) as a control device for a brake system. To the brake ECU 192, there are connected four wheel-speed sensors 194 which are provided so as to correspond to the respective four wheels for detecting respective rotational speeds of the corresponding wheels. The brake ECU 192 has a function of estimating a running speed v of the vehicle (hereinafter referred to as "vehicle speed v" where appropriate) based on values detected by the respective wheel-speed sensors 194. The ECU 170 is configured to obtain the vehicle speed from the brake ECU 192 when necessary.

In the control system of the suspension system according to the present embodiment, the ECU 170 performs the control of the operation of the motor 76 of each actuator 50 on the basis of signals sent from various sensors indicated above. The control system is provided with a control change switch 196 to be operated by a vehicle driver for selecting a desired one of two controls set in a relative-vibration damping control which will be explained. The control change switch 196 is also connected to the ECU 170. In the ROM of the computer of the ECU 170, there are stored programs relating to the control of the actuators 50 which will be explained, various data, and so on.

(B) Control of Electromagnetic Actuator

In the suspension system according to the present embodiment, the following three controls are executed by controlling each actuator 50. More specifically, there are executed: a sprung-vibration damping control for damping a vibration of the sprung portion; a body-posture-change restraining control for restraining pitch and roll of the vehicle body; and the relative-vibration damping control for damping a vibration of the unsprung-side unit 88 caused by the compression coil springs 46, 48, namely, for damping a vibration of the unsprung-side unit 88 relative to the unsprung portion (hereinafter referred to as "relative vibration of the unsprung-side unit 88" where appropriate).

i) Sprung-Vibration Damping Control

Figure 5:
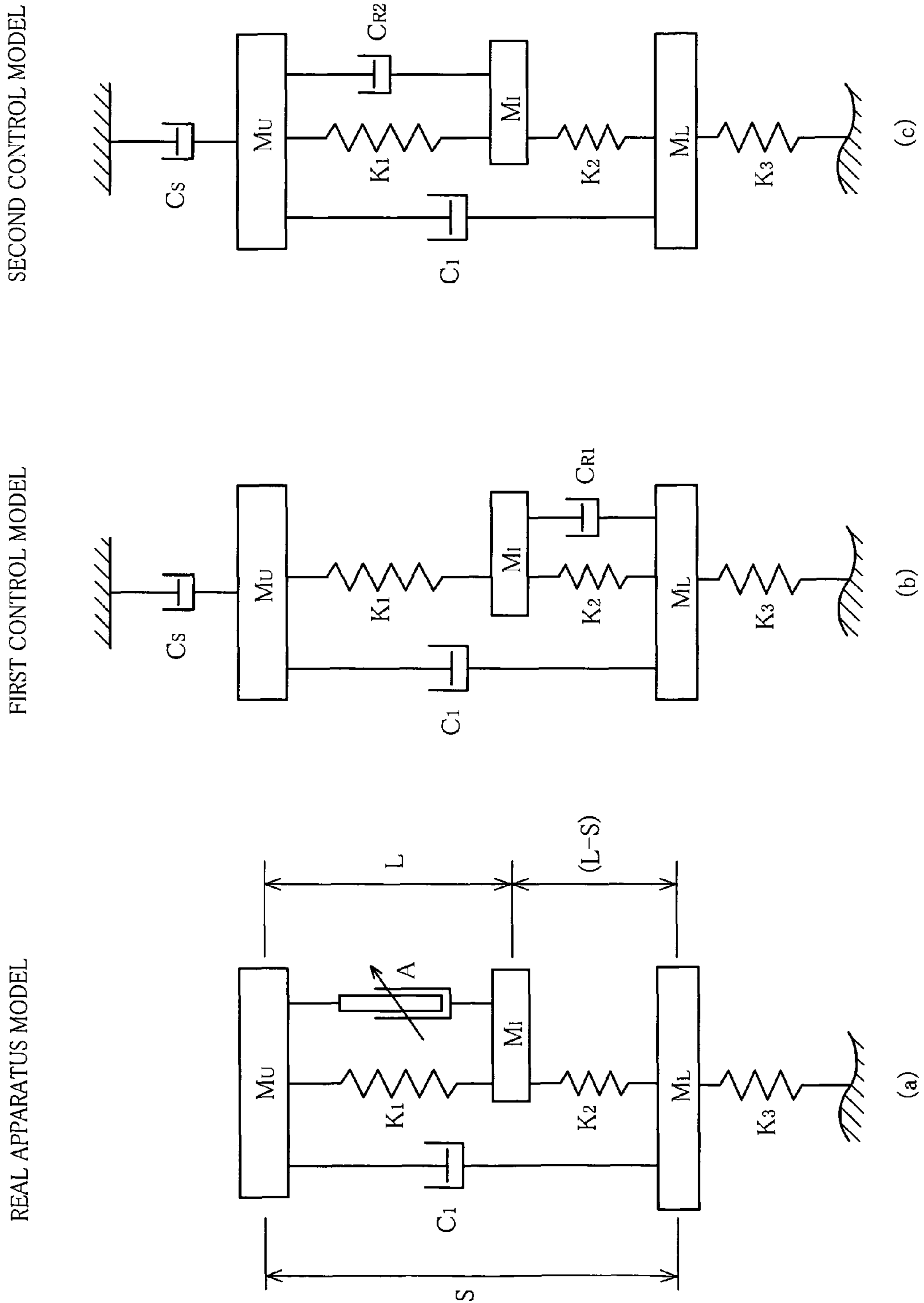
FIGS. 5(*a*)-5(*c*) are schematic views each showing a vibration model with regard to the suspension apparatus of FIG. 2.

A vibration model based on a real apparatus construction (hereinafter referred to as "real apparatus model" where appropriate) of the suspension apparatus 20 is indicated in FIG. 5(*a*). The vibration model includes a sprung mass $M_U$ which is an inertial mass of the sprung portion, an unsprung mass $M_L$ which is an inertial mass of the unsprung portion, and an intermediate mass $M_I$ which is an inertial mass with regard to the operation of the unsprung-side unit 88 of the actuator 50 as explained below. In this model, there is disposed, between the sprung mass $M_U$ and the unsprung mass $M_L$, a damper corresponding to the damper 52, namely, a damper $C_1$ having a damping coefficient $C_1$. Further, there are disposed, between the sprung mass $M_U$ and the intermediate mass $M_I$, a spring corresponding to the compression coil spring 46, namely, a spring $K_1$ having a spring constant $K_1$, and an actuator A corresponding to the actuator 50, so as to be parallel to each other. Moreover, there is disposed, between the intermediate mass $M_I$ and the sprung mass $M_U$, a spring corresponding to the compression coil spring 48, namely, a spring $K_2$ having a spring constant $K_2$. In addition, there is disposed, between the unsprung mass $M_L$ and the road surface, a spring corresponding to the tire, namely, a spring $K_3$ having a spring constant $K_3$.

A control model as a theoretical model for the control of the actuator 50 is indicated in FIGS. 5(*b*) and 5(*c*). In each of those models, the sprung mass $M_U$ is suspended by a skyhook damper $C_S$ having a damping coefficient $C_S$. That is, those control models are based on the skyhook damper theory. The difference between a first control model shown in FIG. 5(*b*) and a second control model shown in FIG. 5(*c*) will be explained later.

The sprung-vibration damping control is executed on the actuators 50 of the respective four suspension apparatuses 20 independently of each other. In the sprung-vibration damping control, the actuator 50 is controlled, according to the above-indicated two control models in each of which is disposed the skyhook damper $C_S$, such that the actuator force to be generated by the actuator A in the real apparatus model becomes equal to a force corresponding to the damping force to be generated by the skyhook damper $C_S$ in the control models. To be more specific, a sprung speed $V_U$ that is a moving speed (absolute speed) of the sprung portion is initially calculated on the basis of vertical acceleration $G_U$ of the sprung portion (hereinafter referred to as "sprung acceleration $G_U$" where appropriate) detected by the sprung-vertical acceleration sensor 186, and the operation of the motor 76 is controlled so as to generate, as a sprung-vibration damping component $F_U$, the actuator force according to the following formula, i.e., the actuator force having a magnitude in accordance with the sprung speed $V_U$:

$$F_U = C_S \cdot V_U$$

The damping coefficient $C_S$ may be considered as a control gain and is set at a value suitable for effectively damping the vibration at and around the sprung resonance frequency. In the suspension system according to the present embodiment, the damper 52 deals with resonance phenomenon of the unsprung portion. In other words, the damping coefficient $C_1$ of the damper $C_1$ in the above-indicated real apparatus model and control models, namely, the damping coefficient of the damper 52, is set at a value suitable for effectively damping the vibration at and around the unsprung resonance frequency.

ii) Body-Posture-Change Restraining Control

In the suspension system according to the present embodiment, the body-posture-change restraining control is executed, in addition to the above-indicated sprung-vibration damping control, in an attempt to mitigate roll of the vehicle body generated upon turning of the vehicle and pitch of the vehicle body generated upon acceleration and deceleration of the vehicle. In the body-posture-change restraining control, there are generated, by the actuator 50, a counter force against roll moment as an acting force that acts on the vehicle body as a cause of the roll of the vehicle body and a counter force against pitch moment as an acting force that acts on the vehicle body as a cause of the pitch of the vehicle body.

Explanation will be made with respect to the roll of the vehicle body. Each of the two actuators 50 of the respective two suspension apparatuses 20 located on the inner side with respect to the turning is controlled to generate the actuator force in a direction in which the sprung portion and the unsprung portion are moved toward each other (hereinafter referred to as "a bound direction" where appropriate) while each of the two actuators 50 of the respective two suspension apparatuses 20 located on the outer side with respect to the turning is controlled to generate the actuator force in a direction in which the sprung portion and the unsprung portion are moved away from each other (hereinafter referred to as "a rebound direction" where appropriate), in accordance with the roll moment indicated above. Each actuator force is generated as a roll restrain component $F_R$ as one sort of a posture-change restrain component.

More specifically, lateral acceleration $G_Y$ to be used in the control is determined according to the following formula on the basis of (1) estimated lateral acceleration $G_{YC}$ that is estimated based on the steering angle δ of the steering wheel detected by the steering sensor 180 and the vehicle speed v obtained by the brake ECU 192; and (2) actual lateral acceleration $G_{YR}$ that is detected by the lateral-acceleration sensor 182:

$$G_Y = ac \cdot G_{YC} \cdot a_R \cdot G_{YR} \text{ (}ac, a_R\text{: gains)}$$

The thus determined lateral acceleration $G_Y$ is a roll-moment index amount indicative of the roll moment that acts on the vehicle body. The roll restrain component $F_R$ is determined based on the lateral acceleration $G_Y$ according to the following formula:

$$F_R=\beta\cdot G_Y \text{ (}\beta\text{: control gain)}$$

Explanation will be made with respect to the pitch of the vehicle body. For nose dive of the vehicle body generated upon braking of the vehicle body, each of the two actuators 50 of the respective two suspension apparatuses 20 located on the front-wheel side of the vehicle is controlled to generate the actuator force in the rebound direction while each of the two actuators 50 of the respective two suspension apparatuses 20 located on the rear-wheel side of the vehicle is controlled to generate the actuator force in the bound direction, in accordance with the pitch moment. Each actuator force is generated as a pitch restrain component $F_P$ as one sort of a posture-change restrain component. For squat of the vehicle body generated acceleration of the vehicle body, each of the two actuators 50 of the respective two suspension apparatuses 20 located on the rear-wheel side of the vehicle is controlled to generate the actuator force in the rebound direction while each of the two actuators 50 of the respective two suspension apparatuses 20 located on the front-wheel side of the vehicle is controlled to generate the actuator force in the bound direction, in accordance with the pitch moment. Each actuator force is generated as the pitch restrain component $F_P$ as one sort of a posture-change restrain component.

More specifically, the longitudinal acceleration $G_X$ detected by the longitudinal-acceleration sensor 182 is employed as a pitch-moment index amount indicative of the pitch moment, and the pitch restrain component $F_P$ is determined on the basis of the actual longitudinal acceleration $G_X$ according to the following formula:

$$F_P=\gamma\cdot G_X \text{ (}\gamma\text{: control gain)}$$

iii) Relative-Vibration Damping Control a) Significance

The unsprung-side unit 88 of the actuator 50 is floatingly supported by the unsprung portion. Accordingly, the unsprung-side unit 88 as the floating unit vibrates relative to the unsprung portion as the unit-floatingly support portion. Where the vibration of the unsprung-side unit 88 relative to the unsprung portion, namely, the relative vibration of the unsprung-side unit 88, is transmitted to the sprung portion, the vehicle driver feels the vibration. Accordingly, such a vibration causes a deterioration in the riding comfort of the vehicle. Further, the vibration becomes a vibration of the unsprung potion, causing a fluctuation in the load that the wheel gives to the ground. In this instance, the steering stability of the vehicle is deteriorated. Since the unsprung-side unit 88 has the intermediate mass $M_I$ inherent thereto as shown in the vibration model of FIG. 5, resonance phenomenon occurs with respect to the vibration of the inherent frequency. When the resonance phenomenon occurs in the relative vibration of the unsprung-side unit 88, the deterioration in the riding comfort and the deterioration in the steering stability become noticeable.

In association with the movement of the unsprung-side unit 88 relative to the sprung-side unit 86, the threaded rod 72 and the motor 76 rotate. Accordingly, in dealing with the vibration of the unsprung-side unit 88, the action of the inertial moment of a rotary body in an instance where the threaded rod 72 and a rotary portion of the motor 76 are regarded as one rotary body should not be excluded. That is, it is desirable to regard, as a part of the inertial mass of the unsprung-side unit 88, a converted mass obtained by converting the inertial moment of the rotary body into the inertial mass in the upward and downward movement of the unsprung-side unit 88. Accordingly, in the vibration model shown in FIG. 5, the intermediate mass $M_I$ is treated as including the converted mass.

b) Two Relative-Vibration Damping Controls

In the suspension system according to the present embodiment, the relative-vibration damping control is executed to deal with the above-indicated relative vibration of the unsprung-side unit 88. Like the sprung-vibration damping control, the relative-vibration damping control is executed on the actuators 50 of the respective four suspension apparatuses 20 independently of each other. In the present suspension system, two mutually different controls are set as the relative-vibration damping control, and one of the two controls is selectively executed.

A first relative-vibration damping control as one of the two controls depends on the first control model shown in FIG. 5(*b*). In the control model, there is disposed, between the intermediate mass $M_I$ and the unsprung mass $M_L$, a relative-vibration damping damper $C_{R1}$ having a damping coefficient $C_{R1}$ as a damper for damping the relative vibration of the unsprung-side unit 88. In the first relative-vibration damping control, the actuator 50 is controlled such that the actuator force to be generated by the actuator A in the real apparatus model shown in FIG. 5(*a*) becomes equal to a force that corresponds to a damping force to be generated by the damper $C_{R1}$. To be more specific, on the basis of a relative moving speed $V_{IL}$ of the unsprung-side unit 88 and the unsprung portion, the operation of the motor 76 is controlled so as to generate, as a relative-vibration damping component $F_L$ the actuator force according to the following formula, i.e., the actuator force having a magnitude in accordance with the relative moving speed $V_{IL}$:

$$F_I=C_{R1}\cdot V_{IL}$$

More specifically, an actuator length L is initially calculated as a relative movement position of the sprung-side unit 86 and the unsprung-side unit 88, on the basis of the motor rotational angle θ detected by the motor-rotational-angle sensor 178. On the basis of a difference between the calculated actuator length L and the stroke amount S detected by the stroke sensor 190, a distance (L−S) between the actuator and the unsprung portion (hereinafter referred to as "actuator-unsprung distance" where appropriate) is calculated. Subsequently, the relative moving speed $V_{IK}$ of the unsprung-side unit 88 and the unsprung portion is calculated on the basis of a rate of change in the distance (L−S). On the basis of the calculated relative moving speed $V_{IL}$, the relative-vibration damping component $F_I$ is determined.

The second vibration-damping control as the other of the two controls indicated above depends on the second control model shown in FIG. 5(*c*). In the control model, there is disposed, between the intermediate mass $M_I$ and the sprung mass $M_U$ a relative-vibration damping damper $C_{R2}$ having a damping coefficient $C_{R2}$ as a damper for damping the relative vibration of the unsprung-side unit 88. In the second relative-vibration damping control, the actuator 50 is controlled such that the actuator force to be generated by the actuator A in the real apparatus model shown in FIG. 5(*a*) becomes equal to a force that corresponds to a damping force to be generated by the damper $C_{R2}$. To be more specific, on the basis of a relative moving speed $V_{IU}$ of the unsprung-side unit 88 and the sprung-side unit 86, the operation of the motor 76 is controlled so as to generate, as the relative-vibration damping component $F_L$ the actuator force according to the following formula, i.e., the actuator force having a magnitude in accordance with the relative moving speed $V_{IU}$:

$$F_I = C_{R2} \cdot V_{IU}$$

More specifically, the actuator length L is initially calculated on the basis of the motor rotational angle θ detected by the motor-rotational-angle sensor 178. On the basis of a rate of change in the calculated actuator length L, the relative moving speed $V_{IU}$ of the unsprung-side unit 88 and the sprung-side unit 86 is calculated, and the relative-vibration damping component $F_I$ is determined based on the calculated relative moving speed $V_{IU}$.

The first and second relative-vibration damping controls are selectively executed by the operation of the control change switch 196 by the driver. The relative vibration of the unsprung-side unit 88 can be effectively restrained by either of the two controls. It is noted that each of the damping coefficients $C_{R1}$, $C_{R2}$ of the respective relative-vibration damping dampers $C_{R1}$, $C_{R2}$ in the above-indicated control models is set at a value suitable for effectively damping the relative vibration of the unsprung-side unit 88 whose frequency is at and around the resonance frequency. Hereinafter, the relative-vibration damping dampers $C_{R1}$, $C_{R2}$ and the damping coefficients $C_{R1}$, $C_{R2}$ are collectively referred to as "relative-vibration damping damper $C_R$" and "damping coefficient $C_R$", respectively, where appropriate.

c) Effect of Relative-Vibration Damping Control

Figure 6:
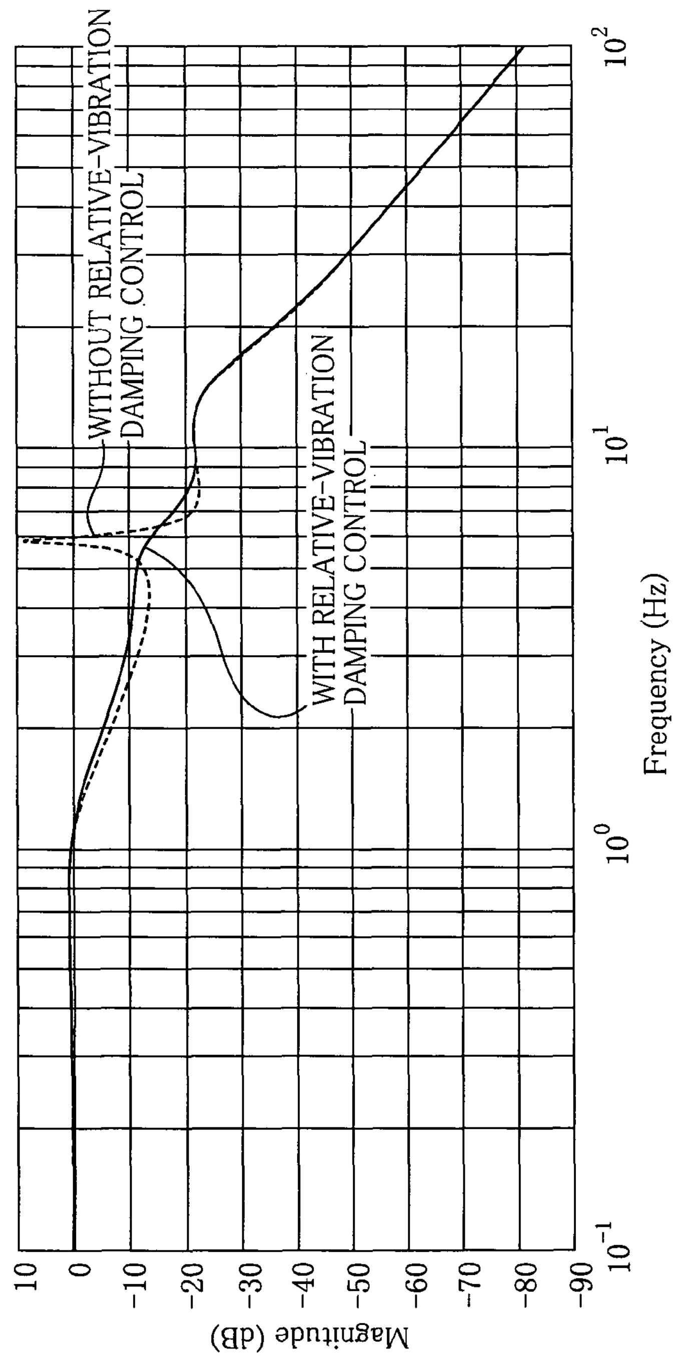
FIG. 6 is a graph showing vibration transmission characteristics of the suspension apparatus of FIG. 2.

FIG. 6 is a graph in which is indicated the intensity with which a vibration that is inputted from the road surface to the unsprung portion is transmitted to the sprung portion. That is, the graph shows vibration transmission characteristics with respect to the vibration frequency. In the graph, the vertical axis indicates the vibration intensity and the horizontal axis indicates the vibration frequency. The dashed line in the graph indicates the characteristics when the above-indicated relative-vibration damping control is not executed while the solid line in the graph indicates the characteristics when the above-indicated relative-vibration damping control is executed.

As apparent from the graph, in an instance where the relative-vibration damping control is not executed, the peak of the vibration transmission intensity exists with respect to the vibration having a frequency of around 6 Hz. That is, there is occurring resonance phenomenon at the frequency as the resonance frequency. The resonance phenomenon arises from the structure in which the unsprung-side unit 88 is elastically supported by the unsprung portion. In contrast, in an instance where the relative-vibration damping control is executed, the above-indicated peak does not exist, and the resonance phenomenon of the unsprung-side unit 88 is effectively restrained or suppressed. Accordingly, the vehicle on which the present suspension system is mounted enjoys improved riding comfort and steering stability owing to the relative-vibration damping control indicated above.

d) Condition for Execution of Relative-Vibration Damping Control

Figure 7:
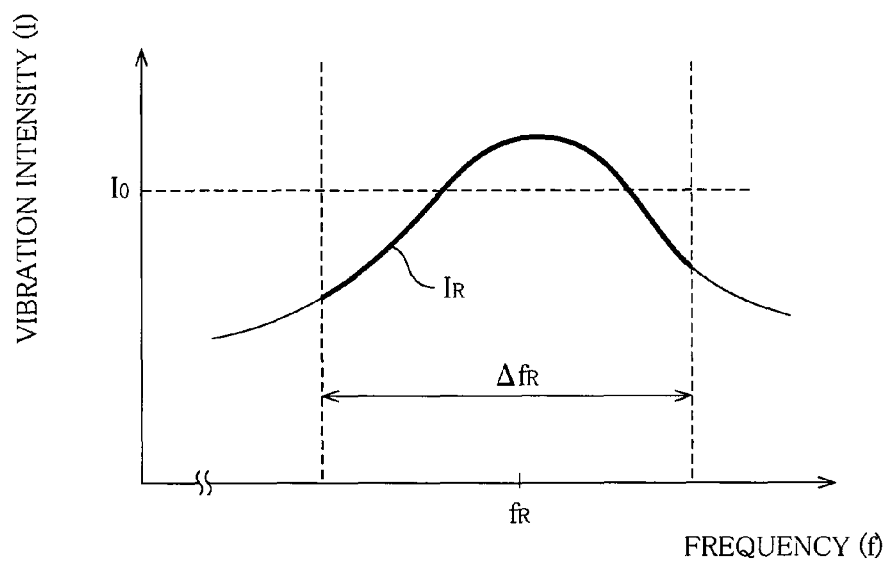
FIG. 7 is a graph schematically showing a component of an intensity of a relative vibration of an unsprung-side unit of the electromagnetic actuator shown in FIG. 3, in a specific frequency range.

The relative-vibration damping control is executed only in a situation in which a specific frequency component of the intensity of the relative vibration of the unsprung-side unit 88 is higher than a threshold. As shown in FIG. 7, a resonance frequency range $\Delta f_R$ is set so as to include the resonance frequency $f_R$ and a frequency band around the resonance frequency $f_R$ (i.e., a band within ±3 Hz of the resonance frequency in the present suspension system), and a vibration intensity component $I_R$ in the resonance frequency range that is the intensity of the relative vibration of the unsprung-side unit 88 in the resonance frequency range $\Delta f_R$ is monitored. (Hereinafter, the vibration intensity component $I_R$ in the resonance frequency range referred to as "resonance-frequency-range vibration-intensity component $I_R$ where appropriate.) In an instance where the component $I_R$ exceeds the threshold $I_O$, the relative-vibration damping control is executed. Since the relative-vibration damping control in the present suspension system aims at mainly suppressing the resonance phenomenon of the unsprung-side unit, the relative-vibration damping control is arranged to be executed on the basis of the intensity component of the relative vibration in the resonance frequency range.

More specifically, in the first relative-vibration damping control, the relative vibration of the unsprung-side unit 88 and the unsprung portion is a direct target for the judgment, and the component of the relative vibration of the unsprung-side unit 88 in the resonance frequency range $\Delta f_R$ is identified by performing filtering process on the relative moving speed $V_{IL}$, of the unsprung-side unit and the unsprung portion. On the basis of the amplitude value of the identified component, the resonance-frequency-range vibration-intensity component $I_R$ is identified. In the second relative-vibration damping control, on the other hand, the relative vibration of the unsprung-side unit 88 and the sprung-side unit 86 is a direct target for the judgment, and the component of the relative vibration of the unsprung-side unit 88 in the resonance frequency range $\Delta f_R$ is identified by performing filtering process on the relative moving speed $V_{IU}$ of the unsprung-side unit 88 and the sprung-side unit 86. On the basis of the amplitude value of the identified component, the resonance-frequency-range vibration-intensity component $I_R$ is identified.

e) Correction of Relative-Vibration Damping Component

As explained above, the movement of the unsprung-side unit 88 relative to the unsprung portion is allowed by the connecting mechanism 64. However, the relative movement is limited by the relative-displacement limiting mechanism 150 so as to be held within the relative-movement allowable range ΔW. Accordingly, when the unsprung-side unit 88 is moved toward the unsprung portion in an instance where the relative vibration of the unsprung-side unit 88 is intense, there is a high possibility that the bottom of the outer tube 60 comes into contact with the upper end portion of the housing 90 of the damper 52. On the other hand, when the unsprung-side unit 88 is moved away from the unsprung portion, there is a high possibility that the inward flange-like lower end portion of the skirt 152 attached to the outer tube 60 comes into contact with the stopper ring 154 attached to the housing 90. In some cases, those contacts accompany an impact. Where the driver feels the impact as a vibration or perceives the impact as the impact sound, the driving comfort is deteriorated. Accordingly, in the present suspension system, the relative-vibration damping component $F_I$ is corrected to prevent or mitigate the impact.

FIG. 3 shows a state in which the unsprung-side unit 88 is placed in a neutral position relative to the unsprung portion. The neutral position is set as a position at which the vehicle is kept stationary on a flat and horizontal road surface. The relative-movement allowable range ΔW is set such that an allowable displacement amount in a direction in which the unsprung-side unit 88 is moved away from the unsprung portion and an allowable displacement amount in a direction in which the unsprung-side unit 88 is moved toward the unsprung portion are made equal to each other with the neutral position being centered. In other words, those allowable displacement amounts are made equal to ΔW/2.

The relative-vibration damping component $F_I$ is corrected so as to increase, in an instance where the relative displacement amount W from the neutral position of the unsprung-side unit 88 exceeds a threshold $W_O$ which is set at a value smaller than the allowable displacement amount ΔW/2. That is, when the unsprung-side unit 88 is moved near to each end of the relative-movement allowable range ΔW to a certain extent, the relative-vibration damping component $F_I$ is increased so as to give a large resistance against a further movement to the end. Specifically, a relative-vibration damping component $F_{IA}$ after correction (hereinafter referred to as "corrected relative-vibration damping component $F_{IA}$" where appropriate) is determined according to the following formula:

$$F_{IA}=\epsilon \cdot F_I \text{ } (\epsilon\text{: correction gain})$$

In this respect, the relative displacement amount W of the unsprung-side unit 88 is calculated based on the above-indicated distance (L−S) between the actuator and the unsprung portion.

Figure 8:
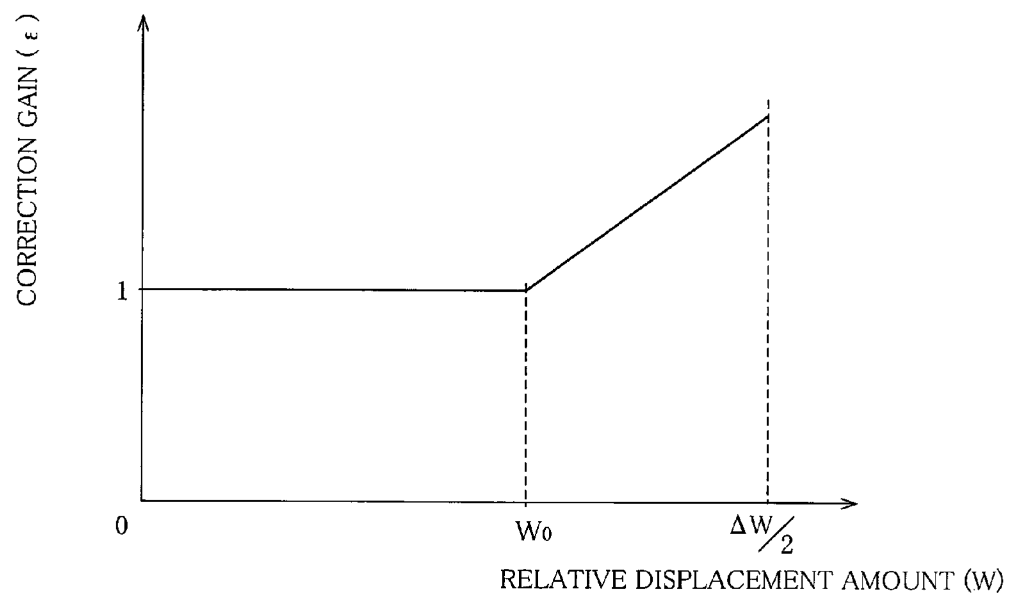
FIG. 8 is a graph showing a correction gain for an actuator force for damping a relative vibration of the unsprung-side unit of the electromagnetic actuator shown in FIG. 3 and an unsprung portion.

The correction gain ε is set as indicated in FIG. 8 and is stored in the ROM of the ECU 170 as map data. In determining the relative-vibration damping component $F_{IA}$ after correction, the map data is referred to, whereby the correction gain ε is obtained as a value in accordance with the relative displacement amount W of the unsprung-side unit 88. As apparent from FIG. 8, the correction gain ε is set at "1" before the relative displacement amount W of the unsprung-side unit 88 exceeds the threshold $W_O$. The correction gain ε is arranged to increase with an increase in the relative displacement amount W when the amount W exceeds the threshold $W_O$.

iv) Synthesizing of Controls

The above-indicated sprung-vibration damping control, body-posture-change restraining control, and relative-vibration damping control are synthetically executed, and the sprung-vibration damping component $F_U$ in the sprung-vibration damping control, the roll restrain component $F_R$ and the pitch restrain control $F_P$ in the body-posture-change restraining control, and the relative-vibration damping component $F_I$ (specifically, the corrected relative-vibration damping component $F_{IA}$) in the relative-vibration damping control are dealt with in a unified way. More particularly, those components $F_U$, $F_R$, $F_P$, $F_{IA}$ are summed up according to the following formula, whereby a synthetic actuator force F to be generated by the actuator 50 is determined:

$$F=F_U+F_R+F_P+F_{IA}$$

In an instance where the relative-vibration damping control is not executed, the relative-vibration damping component $F_I$ is made equal to "0", whereby the relative-vibration damping component $F_{IA}$ after correction is also made equal to "0".

The actuator force in which the components $F_U$, $F_R$, $F_P$, $F_{IA}$ are synthesized is the actuator force to be generated by each of the actuators 50 of the respective four suspension apparatuses 20. The operation of the motor 76 of each actuator 50 is controlled so as to generate the actuator force. To be more specific, a duty ratio D for the motor 76 of each actuator 50 is determined based on the actuator force F to be generated by each actuator 50, and a command as to the determined duty ratio D is sent to the corresponding inverter 172. Each inverter 172 executes the control of the operation of the motor 76 of the corresponding actuator 50.

v) Control Program

Figure 9:
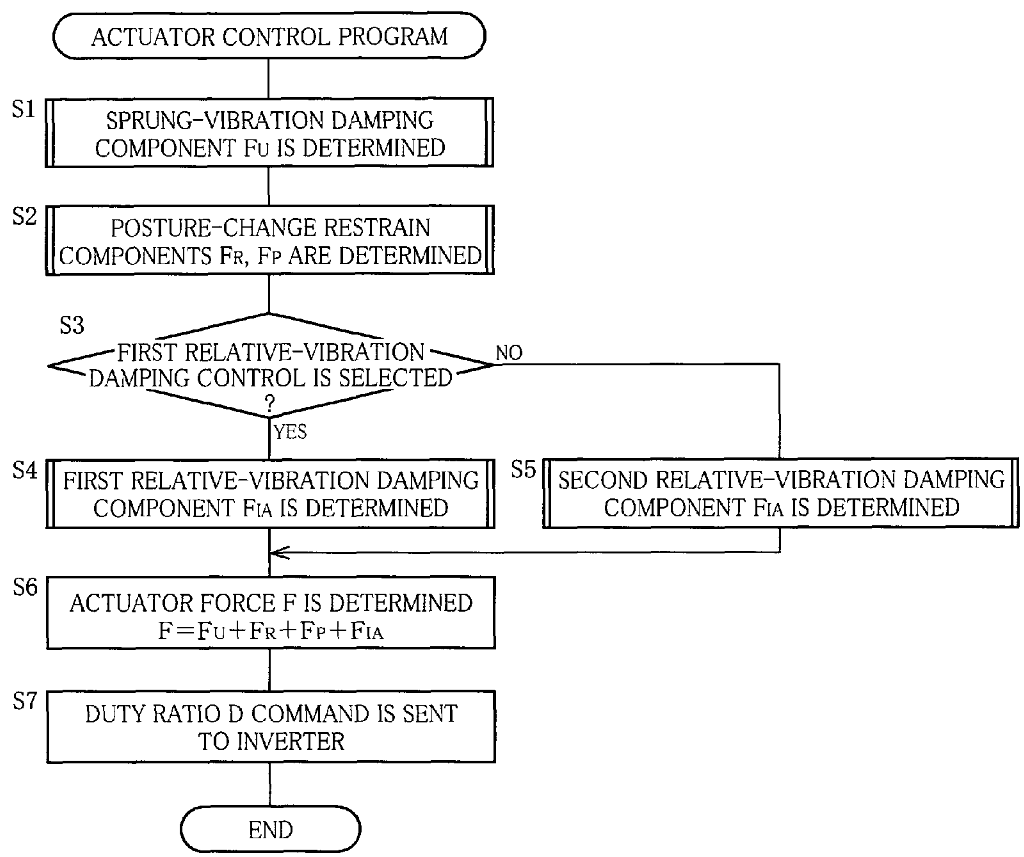
FIG. 9 is a flow chart of an actuator control program for controlling the electromagnetic actuator shown in FIG. 3.

The control of each actuator 50 is executed such that an actuator control program indicated by a flow chart of FIG. 9 is implemented by the ECU 170. The program is repeatedly implemented at short time intervals (e.g., from several milliseconds to several tens of milliseconds) with an ignition switch of the vehicle placed in an ON state. While the processing according to the program is implemented for each of the four actuators 50, the processing is implemented similarly for all of the four actuators 50. Accordingly, the following explanation will be made with respect to one actuator.

Figure 10:
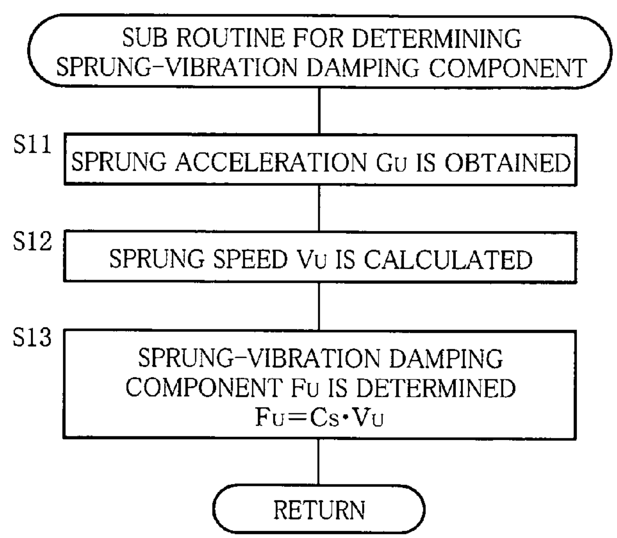
FIG. 10 is a flow chart of a sub routine for determining a sprung-vibration damping component executed in the program of FIG. 9.
Figure 11:
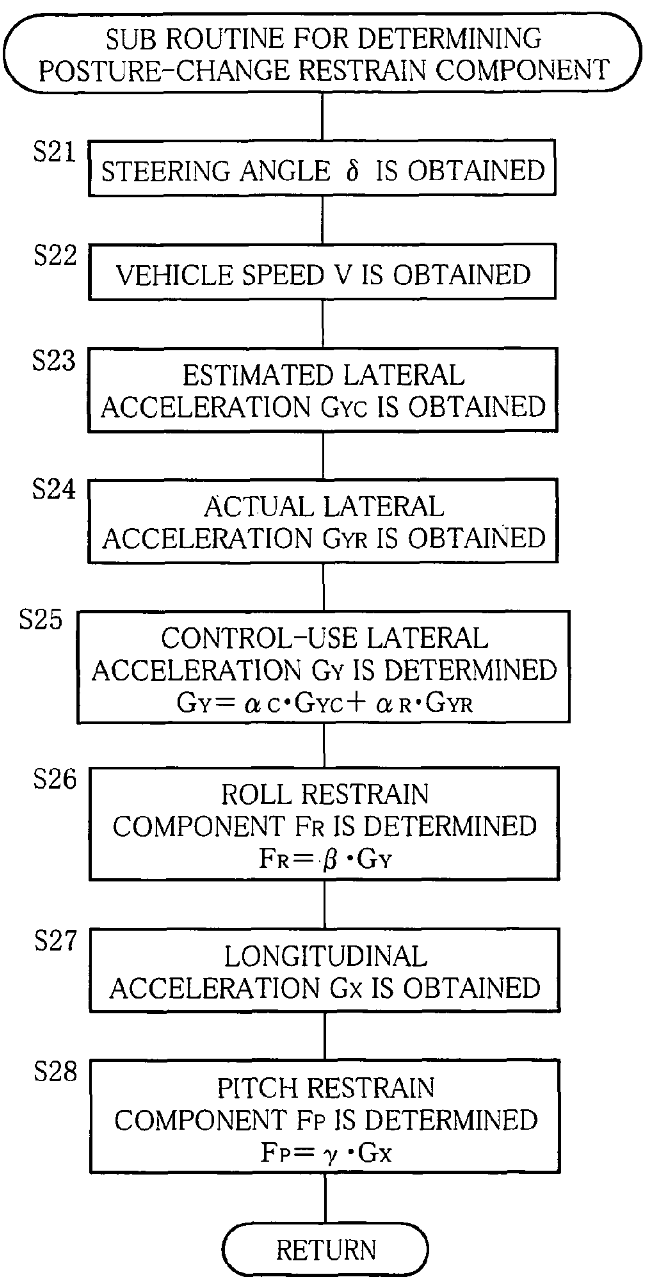
FIG. 11 is a flow chart of a sub routine for determining a posture-change restrain component executed in the program of FIG. 9.
Figure 12:
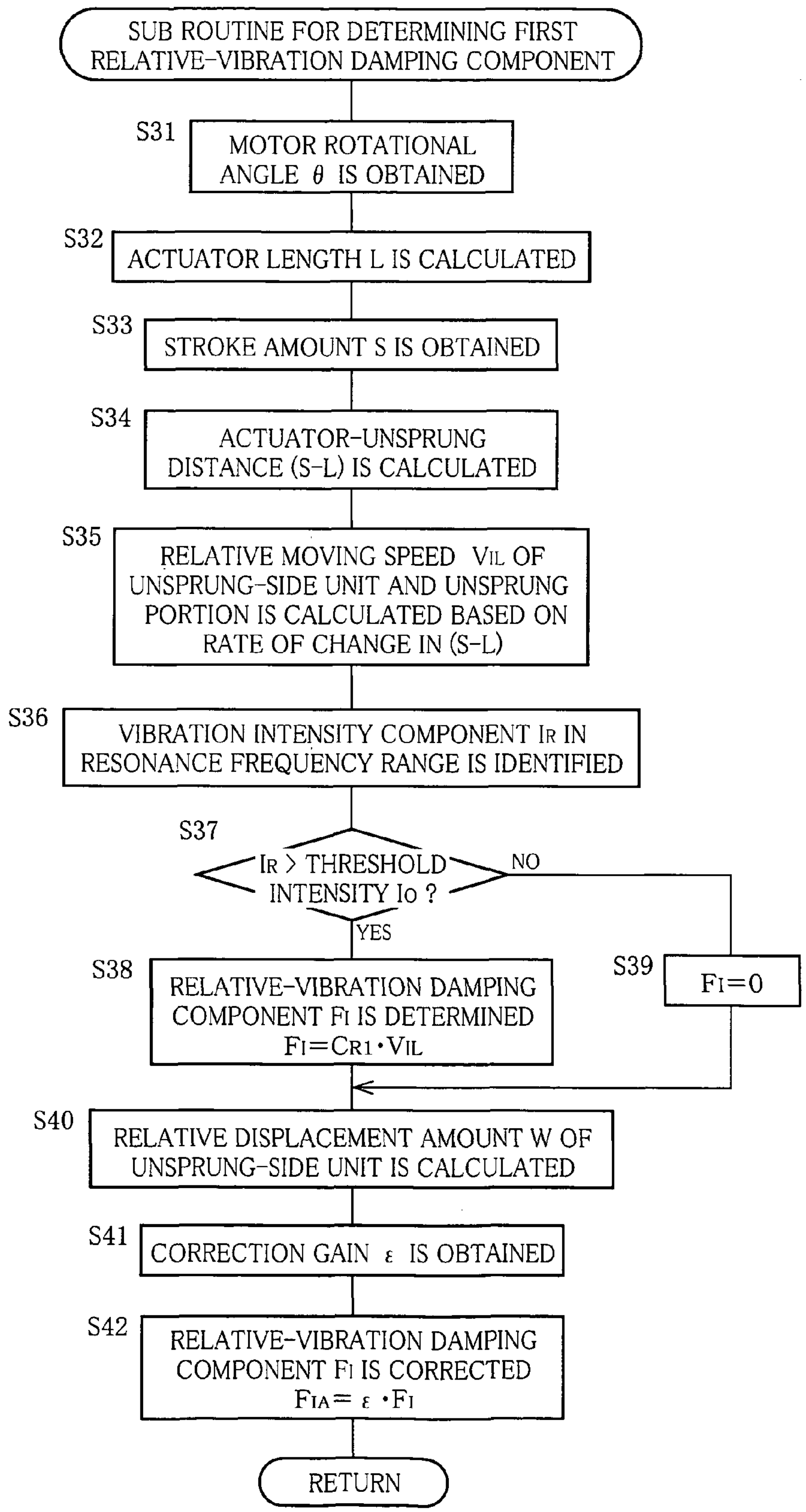
FIG. 12 is a flow chart of a sub routine for determining a first relative-vibration damping component executed in the program of FIG. 9.
Figure 13:
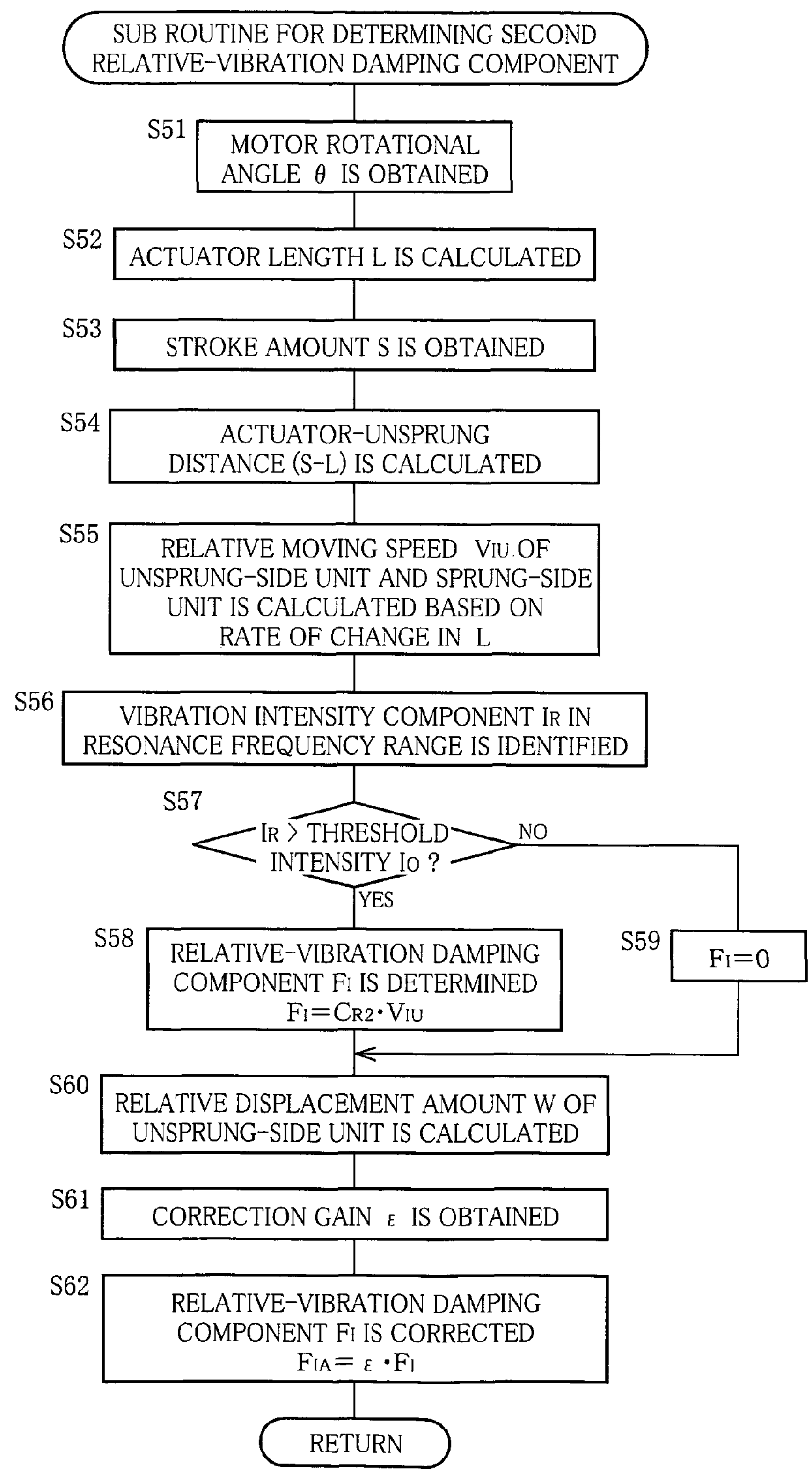
FIG. 13 is a flow chart of a sub routine for determining a second relative-vibration damping component executed in the program of FIG. 9

In the processing according to the actuator control program, step S1 ("step" is omitted where appropriate) is initially implemented to execute a sub routine for determining the sprung-vibration damping component indicated by a flow chart of FIG. 10. Subsequently, S2 is implemented to execute a sub routine for determining the posture-change restrain component indicated by a flow chart of FIG. 11. S2 is followed by S3 to judge which one of the first relative-vibration damping control and the second relative-vibration damping control is being selected as the relative-vibration damping control. Where the first relative-vibration damping control is being sleeted, the control flow goes to S4 in which is executed a sub routine for determining the first relative-vibration damping component indicated by a flow chart of FIG. 12. On the other hand, where the second relative-vibration damping control is being sleeted, the control flow goes to S5 in which is executed a sub routine for determining the second relative-vibration damping component indicated by a flow chart of FIG. 13.

In the above-indicated sub routines, there are respectively determined the sprung-vibration damping component $F_U$, the roll restrain component $F_R$ and the pitch restrain component $F_P$, and the corrected relative-vibration damping component $F_{IA}$ (which is obtained by correction of the relative-vibration damping component $F_I$), each as the component of the actuator force, according to the technique explained above.

After the components $F_U$, $F_R$, $F_P$, $F_{IA}$ have been determined, S6 is implemented to sum up the components $F_U$, $F_R$, $F_P$, $F_{IA}$, so that the synthetic actuator force F is determined. Subsequently, in S7, the command as to the duty ratio D is sent to the inverter 172 based on the determined actuator force F. After the processing in S8 is completed, one execution of the actuator control program is ended. The processing in each of the steps that constitute the actuator control program and the sub routines can be easily understood by referring to the above explanation, and a detailed explanation of which is dispensed with.

(C) Functional Structure of Controller

The ECU 170 in the suspension system according to the present embodiment functions as a controller for controlling the actuator force to be generated by each of the electromagnetic actuators 50. The ECU 170 may be considered to have the functional structure shown in FIG. 14 in terms of the function thereof.

Figure 14:
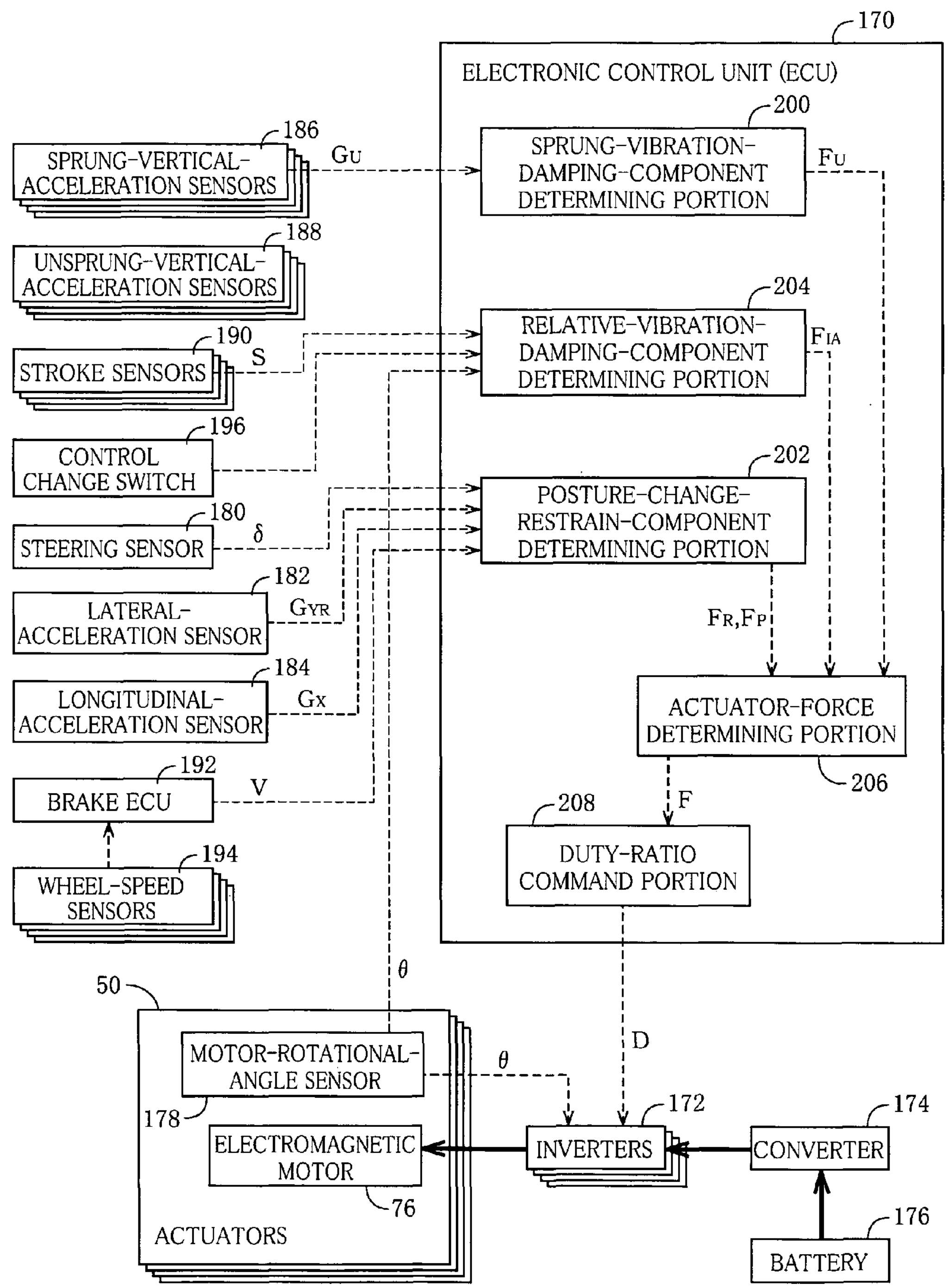
FIG. 14 is a block diagram showing a functional structure of a controller of the suspension system of FIG. 1.

As shown in FIG. 14, the ECU 170 includes three component determining portions 200, 202, 204 for determining the respective components of the actuator force. More particularly, the ECU 170 includes: a sprung-vibration-damping-component determining portion 200 for determining the sprung-vibration damping component $F_U$; a posture-change-restrain-component determining portion 202 for determining the roll restrain component $F_R$ and the pitch restrain component $F_P$; and a relative-vibration-damping-component determining portion 204 for determining the relative-vibration damping component $F_I$ (strictly, for determining the corrected relative-vibration damping component $F_{IA}$).

More specifically, the sprung-vibration-damping-component determining portion 200 corresponds to a portion of the ECU 170 that executes the processing in S1 of the actuator control program, namely, the processing according to the sub routine for determining the sprung-vibration damping component. The posture-change-restrain-component determining portion 202 corresponds to a portion of the ECU 170 that executes the processing in S2, namely, the processing according to the sub routine for determining the posture-change restrain component. The relative-vibration-damping-component determining portion 204 corresponds to a portion of the ECU 170 that executes the processing in S3-S5, namely, the processing according to one of the sub routine for determining the first relative-vibration damping component and the sub routine for determining the second relative-vibration damping component that is selected by the operation of the control change switch 196.

The ECU 170 further includes an actuator-force determining portion 206 as a portion that executes the processing in S6, namely, as a portion for determining the actuator force F to be generated by each actuator 50, by synthesizing the components $F_U$, $F_R$, $F_P$, $F_I$, $(F_{IA})$. In addition, the ECU 170 includes a duty-ratio command portion 208 as a portion that executes the processing in S7, namely, as a portion for sending the command as to the duty ratio D to the inverter 172 of the corresponding actuator 50, on the basis of the actuator force F.

According to the functional structure described above, the ECU 170 may be considered to have the following three control portions for executing respective three controls: a sprung-vibration-damping control portion which includes the sprung-vibration-damping-component determining portion 200 and which executes the above-indicated sprung-vibration damping control; a body-posture-change-restraining control portion which includes the posture-change-restrain-component determining portion 202 and which executes the above-indicated body-posture-change restraining control; and a relative-vibration-damping control portion which includes the relative-vibration-damping-component determining portion 204 and which executes the above-indicated relative-vibration damping control.

2. Second Embodiment

(A) Structure of Suspension System i) Overall Structure

Like the suspension system according to the illustrated first embodiment, a suspension system for a vehicle according to a second embodiment has four suspension apparatuses. However, each suspension apparatus in the second embodiment differs in structure from the suspension apparatuses 20 according to the first embodiment.

Figure 15:
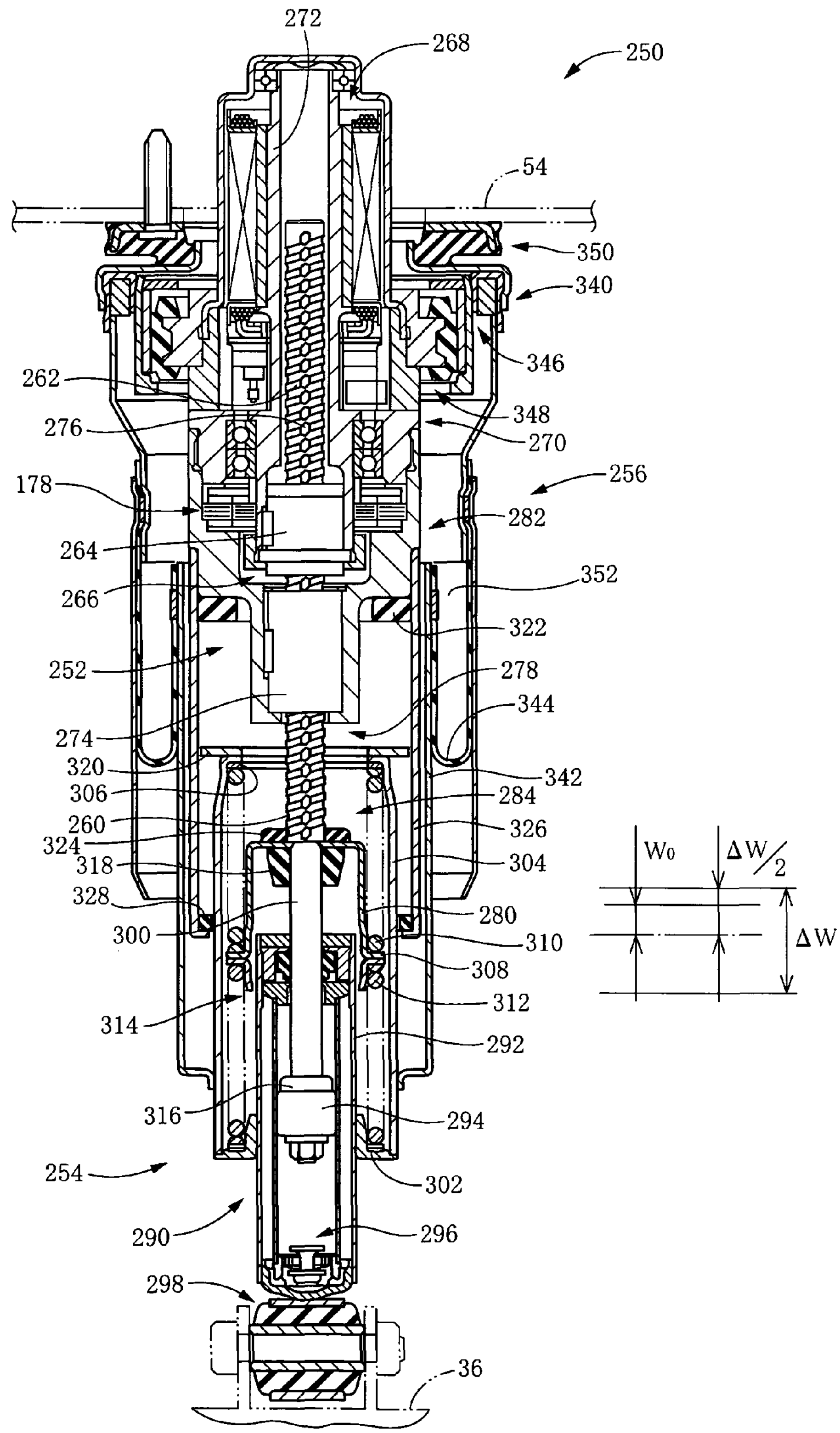
FIG. 15 is a cross sectional view showing a spring·actuator Assy employed in a suspension apparatus of a suspension system according to a second embodiment.

More specifically, in each suspension apparatus according to the second embodiment, a spring·actuator Assy 250 shown in FIG. 15 is employed in place of the two compression coil springs 46, 48, the actuator 50, the damper 52, and the connecting mechanism 64 employed in the suspension system of the first embodiment. In the spring·actuator Assy 250, a main spring which elastically connects the sprung portion and the unsprung portion, namely, a suspension spring, and an electromagnetic actuator are united. In this respect, the main spring is an air spring as one sort of a fluid spring which utilizes an air pressure.

The control system of the suspension system according to the second embodiment has functions similar to those of the control system of the suspension system according to the first embodiment, except for a function for controlling the main spring indicted above. In other words, the structure for controlling the electromagnetic actuator is substantially similar to that of the control system employed in the suspension system according to the first embodiment.

Accordingly, the following explanation of the structure of the suspension system according to the second embodiment will be made focusing on portions that differ from the suspension system according to the first embodiment, and a detailed explanation of the corresponding or similar constituent elements is minimized while using the same reference numerals as used in the first embodiment to identify those elements.

ii) Structure and Function of Spring·Actuator Assy 250

As shown in FIG. 15, the spring·actuator Assy 250 is disposed between the mount portion 54 as one constituent component of the sprung portion and the second lower arm 36 as one constituent component of the unsprung portion. The spring·actuator Assy 250 includes: an electromagnetic actuator 252 that functions as an electromagnetic shock absorber; a connecting mechanism 254 for connecting the actuator 252 and the second lower arm 36; and an air spring 256, which are united.

a) Structure of Actuator

The actuator 252 includes: a ball screw mechanism 266 including a threaded rod 262 as an external thread portion on which is formed a threaded groove 260 and a nut 264 as an internal thread portion which holds bearing balls and which is screwed with the threaded rod 262; an electromagnetic motor 268 as a power source (hereinafter simply referred to as "motor 268" where appropriate); and a casing 270 which accommodates the ball screw mechanism 266 and the motor 268. The casing 270 is connected at its outer circumferential portion to the mount portion 54. The motor 268 which is a DC brushless motor has a hollow motor shaft 272, and the nut 264 is fixed to an inner section of a lower end portion of the motor shaft 272. That is, the motor 268 is configured to give a rotational force to the nut 264. The threaded rod 262 is disposed so as to extend downwardly from the inside of the motor shaft 272 while being screwed with the nut 264. In the actuator 252 of the present embodiment, the motor-rotational-angle sensor 178 is disposed in the casing 270 so as to detect the rotational angle of the motor shaft 272.

In the casing 270, a rod holder 274 is fixed coaxially with the nut 264. In addition to the threaded groove 260, a spline groove 276 is formed on the threaded rod 262 which is one constituent element of the ball screw mechanism 266, and the threaded rod 262 and the rod holder 274 are spline-fitted. The threaded rod 262 is configured to be unrotatable and movable in the axis direction relative to the casing 270, by a ball spline mechanism 278 constituted by including the threaded rod 262 and the rod holder 274.

The threaded rod 262 extends downwardly from the casing 270. At a lower end portion of the threaded rod 262, there is disposed a spring support member 280 which has a cup-like configuration opening downward and at which the actuator 252 is connected to the second lower arm 36 via the connecting mechanism 254 that will be explained in detail.

In the structure described above, the actuator 252 has: a sprung-side unit 282 fixedly connected to the sprung portion; and an unsprung-side unit 284 connected to the unsprung portion via the connecting mechanism 254. The sprung-side unit 282 includes the casing 270, the motor 268, the nut 264, and the rod holder 274 while the unsprung-side unit 284 includes the threaded rod 262 and the spring support member 280.

b) Structure of Connecting Mechanism

The connecting mechanism 254 includes a hydraulic damper 290. The damper 290 has a structure similar to that of the damper 52 in the illustrated first embodiment. Briefly, the damper 290 has: a housing 292 having a twin tube structure and accommodating a working fluid; and a piston 294 which divides an inside of an inner cylindrical member of the housing 292 into two fluid chambers and which is slidably fitted in the inner cylindrical member. The damper 290 is configured to give, in association with the movement of the piston 294, a resistance against the flow of the working fluid between the two fluid chambers in the housing 292 by valves provided on the piston 294 and is configured to give a resistance against the flow of the working fluid between a buffer chamber and a lower fluid chamber by valves provided on a partition wall 296, namely, against the flow of the working fluid through an auxiliary fluid chamber formed at a lower portion of the partition wall 296.

The housing 292 is connected, via a bush 298 disposed at its lower end portion, to the second lower arm 36. A piston rod 300 fixedly connected to the lower end portion of the threaded rod 262 extends into the housing 292, and the piston 294 is connected to the lower end of the piston rod 300. According to the structure, the threaded rod 262, namely, the unsprung-side unit 284, is connected to the second lower arm 36 via the damper 290.

An annular lower spring seat 302 is attached to an outer circumferential portion of the housing 292 of the damper 290. A cylindrical support member 304 is fixed to the lower spring seat 302 such that the cylindrical support member 304 accommodates the housing 292. An inward flange-like upper spring seat 306 is provided at an upper end portion of the cylindrical support member 304. The spring support member 280 explained above is fixed to the threaded rod 262 and the piston rod 300 at a joint therebetween. The spring support member 280 is accommodated in the cylindrical support member 304 while accommodating the upper end portion of the housing 292 therein. In the vicinity of the lower end portion of the spring support member 280, an outward flange-like intermediate spring seat 308 is provided.

A compression coil spring 310 is disposed in a compressed state between the upper spring seat 306 and the intermediate spring seat 308 while a compression coil spring 312 is disposed in a compressed state between the intermediate spring seat 308 and the lower spring seat 302. The two compression coil springs 310, 312 cooperate with each other to function as a support spring for permitting the spring support member 280, namely, the unsprung-side unit 284, to be floatingly supported by the unsprung portion, owing to the elastic force thereof.

In the structure described above, the connecting mechanism 254 allows a movement of the unsprung-side unit 284 relative to the unsprung portion. The relative displacement of the unsprung-side unit 284 and the unsprung portion in the relative movement thereof is limited by a relative-displacement limiting mechanism 314 which is included in the connecting mechanism 254. More specifically, in an instance where the unsprung-side unit 284 and the unsprung portion are moved relative to each other in a direction away from each other, a cushion rubber 316 attached to the piston 294 comes into abutting contact with a lower surface of an inner cap of the housing 292 of the damper 290, thereby limiting the relative movement away from each other. On the other hand, in an instance where the unsprung-side unit 284 and the unsprung portion are moved relative to each other in a direction toward each other, a cushion rubber 318 attached to an inside portion of the spring support member 280 comes into abutting contact with an upper surface of an outer cap of the housing 292, thereby limiting the relative movement toward each other. That is, the relative-displacement limiting mechanism 314 is constituted by including the inner cap and the outer cap of the housing 292 and the two cushion rubbers 316, 318. As in the illustrated first embodiment, the range of the relative movement is limited by the relative-displacement limiting mechanism 314 so as to be held within a relative-movement allowable range ΔW shown in FIG. 15.

In the present suspension apparatus 20, a bound stopper mechanism and a rebound stopper mechanism for the stroke movement of the sprung portion and the unsprung portion are provided on the spring·actuator Assy 250. The movement of the sprung portion and the unsprung portion toward each other is limited by an abutting contact of a stopper plate 320 provided at an upper end of the cylindrical support member 304 with a cushion rubber 322 provided on the casing 270 of the unsprung-side unit 282 or by an abutting contact of a lower end surface of a section of the casing 270 at which the rod holder 274 is disposed, with a cushion rubber 324 provided on an upper surface of the spring support member 280. On the other hand, the movement of the sprung portion and the unsprung portion away from each other is limited by an abutting contact of the stopper plate 320 with a cushion rubber 328 provided at an inner flange portion at a lower end of the skirt 326 which is attached to the casing 270. It is noted that the above-indicated relative-movement allowable range ΔW is made smaller than an allowable range of the stroke movement.

c) Structure of Air Spring

The air spring 256 includes: a chamber shell 340 connected to the mount portion 54; an air piston cylinder 342 which is fixed to the housing 292 of the damper 290 and is thereby connected to the second lower arum 36; and a diaphragm 344 connecting the chamber shell 340 and the air piston cylinder 342.

The chamber shell 340 has a cap portion 346 that is connected to the casing 270 of the actuator 252 via a spring support 348 including a vibration damping rubber. The cap portion 346 is connected to the mount portion 54 via an upper support 350 including a vibration damping rubber. The air piston cylinder 342 is fixed at its lower end portion to the outer circumferential portion of the cylindrical support member 304 of the connecting mechanism 254 while accommodating, therein, the upper portion of the cylindrical support member 304 and the skirt 326 attached to the casing 270.

The diaphragm 344 is fixed at one end thereof to a lower end portion of the chamber shell 340 and is fixed at another end thereof to an upper end portion of the air piston cylinder 342. The chamber shell 340, the air piston cylinder 342, and the diaphragm 344 cooperate with each other to define a pressure chamber 352 which is filled with compressed air as a fluid.

In the structure described above, the air spring 256 elastically connects, owing to the pressure of the compressed air, the second lower arm 36 and the mount portion 54, namely the sprung portion and the unsprung portion. Where it is supposed that the above-indicated compression coil springs 310, 312 constitute one spring, the spring constant of the one spring is made larger than that of the air spring 256.

d) Function of Spring·Actuator Assy 250

In the present suspension apparatus 20, the sprung-side unit 282 of the actuator 252 as a fixed unit is fixedly connected to the sprung portion as a unit fixation portion while the unsprung-side unit 284 as a floating unit is floatingly supported by the unsprung portion as a unit-floatingly support portion.

When the sprung portion and the unsprung portion are moved toward and away from each other, the sprung-side unit 282 and the unsprung-side unit 284 are moved relative to each other in association with the stroke movement of the sprung portion and the unsprung portion. Owing to the relative movement, the nut 264 rotates together with the motor shaft 272 while the threaded rod 262 and the nut 264 move relative to each other in the axis direction. The motor 268 is configured to give a rotational force to the nut 264. Owing to the rotational force given by the motor 268, the actuator 252 generates an actuator force as a resistance force against or a propulsive force with respect to the relative movement of the sprung-side unit 282 and the unsprung-side unit 284.

The actuator force acts on the sprung portion and the unsprung portion via the connecting mechanism 254. The connecting mechanism 254 has a structure in which the compression coil springs 310, 312 are interposed between the unsprung portion and the unsprung-side unit 284. That is, in the present suspension apparatus 20, the unsprung-side unit 284 is floatingly supported by the unsprung portion owing to the compression coil springs 310, 312. In this structure, the actuator force acts on the sprung portion and the unsprung portion with some time lag or delay. In view of this, the present spring·actuator Assy 250 is configured such that the connecting mechanism 254 has the damper 290 disposed between the unsprung portion and the unsprung-side unit 284, thereby improving the responsiveness of the actuator force.

In addition to the function as an ordinary suspension spring, the air spring 256 has a function of changing a distance between the sprung portion and the unsprung portion by permitting the air to flow into or discharge from the pressure chamber 352. By utilizing the function, the suspension system according to the present embodiment is configured to change and adjust a distance between the vehicle body and the road surface, namely, a height of the vehicle. A description of the structure and control relating to changing and adjusting of the vehicle height is dispensed with.

(B) Control of Electromagnetic Actuator

In the suspension system according to the present embodiment, there are executed controls similar to the sprung-vibration damping control and the body-posture-change restraining control executed in the suspension system according to the illustrated first embodiment. Concerning the relative-vibration damping control, the first relative-vibration damping control executed in the suspension system according to the illustrated first embodiment is not executed, and only a control similar to the second relative-vibration damping control is executed. In addition to those controls, an unsprung-vibration damping control described below is executed in the suspension system according to the present embodiment. While those controls will be hereinafter explained in order, explanations similar to those in the illustrated first embodiment will be minimized.

i) Sprung-Vibration Damping Control

Figure 16:
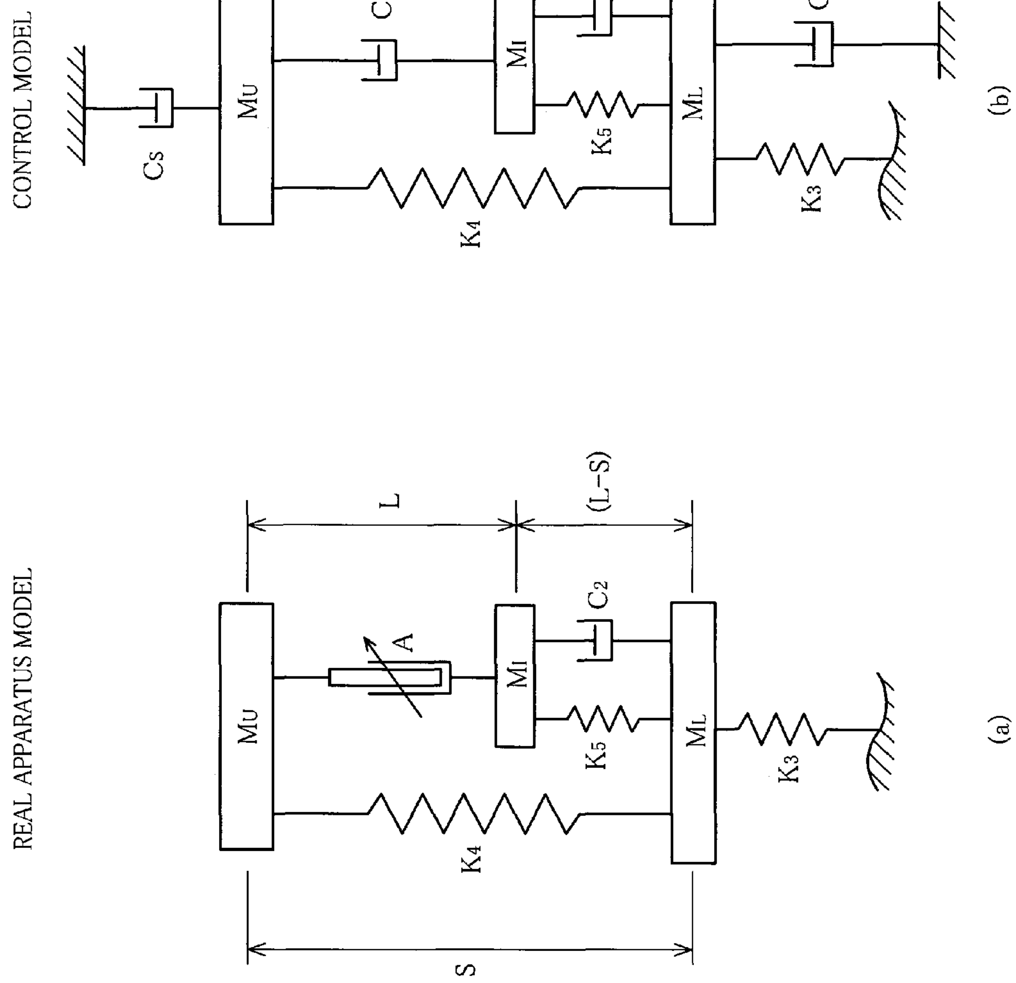
FIGS. 16(*a*)-16(*b*) are schematic views each showing a vibration model with regard to the suspension apparatus of the suspension system according to the second embodiment.

A real apparatus model of the suspension apparatus 20 of the suspension system according to the present embodiment is indicated in FIG. 16(*a*). As in the real apparatus model explained with respect to the illustrated first embodiment, this vibration model includes a sprung mass $M_U$, an unsprung mass $M_L$, and an intermediate mass $M_I$. The intermediate mass $M_I$ includes a converted mass of a rotary body in an instance where the nut 264 and a rotary portion of the motor 268 such as the motor shaft 272 are regarded as one rotary body, more specifically, a converted mass obtained by converting inertial moment of the rotary body into an inertial mass in the upward and downward movement of the unsprung-side unit 284.

As in the real apparatus model in the illustrated first embodiment, the real apparatus model in the present embodiment includes an actuator A corresponding to the actuator 252 disposed between the sprung mass $M_U$ and the intermediate mass $M_I$. Further, there is disposed, between the unsprung mass $M_L$ and the road surface, a spring corresponding to the tire, namely, a spring $K_3$ having a spring constant $K_3$.

Unlike the real apparatus model in the illustrated first embodiment, the real apparatus model in the present embodiment includes, between the sprung mass $M_U$ and the unsprung mass $M_L$, a main spring corresponding to the air spring 256, namely, a spring $K_4$ having a spring constant $K_4$. Between the intermediate mass $M_I$ and the unsprung mass $M_L$, there is disposed a spring corresponding to the support spring constituted by the compression coil springs 310, 312, namely, a spring $K_5$ having a spring constant $K_5$. Further, a damper corresponding to the damper 252, namely, a damper $C_2$ having a damping coefficient $C_2$, is disposed in parallel with the spring $K_5$. Since the damper $C_2$ is for improving the responsiveness of the actuator force as explained above, the damping coefficient $C_2$ is set at a suitable value to attain the purpose.

A control model as a theoretical model for the control of the actuator 252 is indicated in FIG. 16(*b*). As in the control model of the illustrated first embodiment, the sprung mass $M_U$ is suspended by a skyhook damper $C_S$ having a damping coefficient $C_S$ in the control model of the present embodiment.

As in the illustrated first embodiment, the sprung-vibration damping control is executed on the actuators 252 of the respective four suspension apparatuses 20 independently of each other. The operation of each motor 268 is controlled such that the corresponding actuator 252 generates, as the sprung-vibration damping component $F_U$, the actuator force according to the following formula, on the basis of the sprung speed $V_U$:

$$F_U=C_S \cdot V_U$$

The concrete technique of the sprung-vibration damping control is similar to that in the illustrated first embodiment, and its detailed explanation is dispensed with.

ii) Unsprung-Vibration Damping Control

The unsprung-vibration damping control is based on the so-called quasi ground-hook damper theory and is executed on the actuators 252 of the respective four suspension apparatuses 20 independently of each other. In the control model shown in FIG. 16(*b*), the unsprung mass $M_L$ is supported by a virtual road surface line (ground line) via a damper $C_G$ having a damping coefficient $C_G$. Since the damper $C_G$ is a damper based on the quasi ground-hook damper theory, the damper $C_G$ is hereinafter referred to as "ground-hook damper $C_G$" where appropriate.

In the unsprung-vibration damping control, the actuator 252 is controlled such that the actuator force to be generated by the actuator A in the real apparatus model becomes equal to a force corresponding to the damping force to be generated by the ground-hook damper $C_G$ in the control model. To be more specific, an unsprung speed $V_L$ that is a moving speed (absolute speed) of the unsprung portion is initially calculated on the basis of vertical acceleration $G_L$ of the unsprung portion (hereinafter referred to as "unsprung acceleration $G_L$" where appropriate) detected by the unsprung-vertical acceleration sensor 188, and the operation of the motor 268 is controlled so as to generate, as an unsprung-vibration damping component $F_L$, the actuator force according to the following formula, i.e., the actuator force having a magnitude in accordance with the unsprung speed $V_L$:

$$F_L=C_G \cdot V_L$$

The damping coefficient $C_G$ may be considered as a control gain and is set at a value suitable for effectively damping the vibration at and around the unsprung resonance frequency.

iii) Body-Posture-Change Restraining Control

The body-posture-change restraining control is for restraining roll and pitch of the vehicle body and is executed in a manner similar to that in the illustrated first embodiment. While not explained in detail, the roll restrain component $F_R$ is determined according to the following formula on the basis of the lateral acceleration $G_Y$ indicated above:

$$F_R=\beta\cdot G_Y \text{ (}\beta\text{: control gain)}$$

The pitch restrain component $F_P$ is determined according to the following formula on the basis of the actual longitudinal acceleration $G_X$:

$$F_P=\gamma\cdot G_X \text{ (}\gamma\text{: control gain)}$$

iv) Relative-Vibration Damping Control

In each suspension apparatus 20 of the suspension system according to the illustrated first embodiment, the unsprung-side unit 284 of the actuator 252 is floatingly supported relative to the unsprung portion. Accordingly, the unsprung-side unit 284 as the floating unit vibrates relative to the unsprung portion as the unit-floatingly support portion. Like the relative-vibration damping control in the first embodiment, the relative-vibration damping control in the present embodiment aims at dealing with the relative vibration.

In the control model shown in FIG. 16(*b*), there is disposed, between the intermediate mass $M_I$ and the sprung mass $M_U$, a relative-vibration damping damper $C_R$ having a damping coefficient $C_R$ as a damper for damping the relative vibration of the unsprung-side unit 284. The relative-vibration damping control in the present embodiment depends on the control model and is similar to the second relative-vibration damping control in the first embodiment. In the relative-vibration damping control in the present embodiment, each actuator 252 is controlled such that the actuator force to be generated by the actuator A in the real apparatus model becomes equal to a force that corresponds to the damping force to be generated by the relative-vibration damping damper $C_R$.

The concrete control technique is similar to that of the illustrated second relative-vibration damping control. That is, the operation of the motor 268 is controlled to generate, as the relative-vibration damping component $F_L$ the actuator force according to the following formula, on the basis of the relative moving speed $V_{IU}$ of the unsprung-side unit 284 and the sprung-side unit 282:

$$F_I=C_R\cdot V_{IU}$$

The damping coefficient $C_R$ of the relative-vibration damping damper $C_R$ is set at a value suitable for effectively damping the relative vibration of the unsprung-side unit 284 at and around the resonance frequency.

The relative-vibration damping control in the present embodiment is executed only in a situation in which the specific frequency component of the intensity of the relative vibration of the unsprung-side unit 282 is higher than the threshold, in accordance with the execution condition similar to that in the relative-vibration damping control of the illustrated first embodiment. Further, in an attempt to prevent or mitigate the impact due to provision of the relative-displacement limiting mechanism 314, the relative-vibration damping component $F_I$ is corrected as in the control of the first embodiment. The concrete techniques as to execution of the control based on the execution condition and as to the correction of the relative-vibration damping component $F_I$ are similar to those in the first embodiment.

v) Synthesizing of Controls

The above-indicated sprung-vibration damping control, the unsprung-vibration damping control, the body-posture-change restraining control, and relative-vibration damping control are synthetically executed, and the sprung-vibration damping component $F_U$ in the sprung-vibration damping control, the unsprung-vibration damping component $F_L$ in the unsprung-vibration damping control, the roll restrain component $F_R$ and the pitch restrain control $F_P$ in the body-posture-change restraining control, and the relative-vibration damping component $F_I$ (namely, the corrected relative-vibration damping component $F_{IA}$) in the relative-vibration damping control are dealt with in a unified way. More particularly, those components $F_U$, $F_L$, $F_R$, $F_P$, $F_{IA}$ are summed up according to the following formula, whereby a synthetic actuator force F to be generated by each actuator 252 is determined:

$$F=F_U+F_L+F_R+F_P+F_{IA}$$

As in the first embodiment, a duty ratio D for the motor 268 of each actuator 252 is determined based on the synthetic actuator force F to be generated by each actuator 252, and a command as to the determined duty ratio D is sent to the corresponding inverter 172. Each inverter 172 executes the control of the operation of the motor 268 of the corresponding actuator 252 based on the duty ratio D.

v) Control Program

Figure 17:
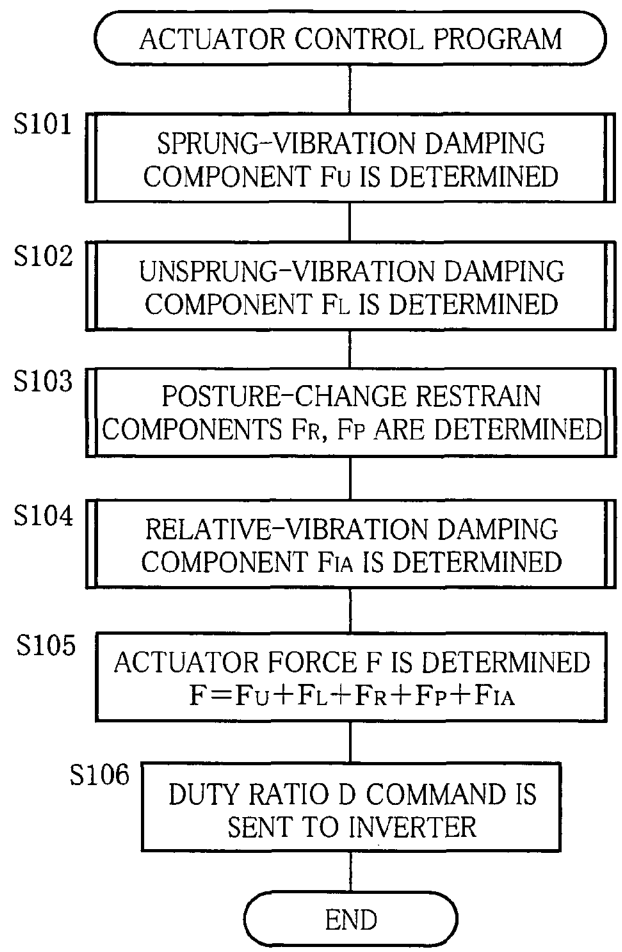
FIG. 17 is a flow chart of an actuator control program for controlling an electromagnetic actuator of the spring·actuator Assy shown in FIG. 15.

The control of each actuator 252 is executed such that an actuator control program indicated by a flow chart of FIG. 17 is implemented by the ECU 170. Like the actuator control program in the first embodiment, the program in the present embodiment is repeatedly implemented for each actuator 252 at short time intervals (e.g., from several milliseconds to several tens of milliseconds) with the ignition switch of the vehicle placed in the ON state.

Figure 18:
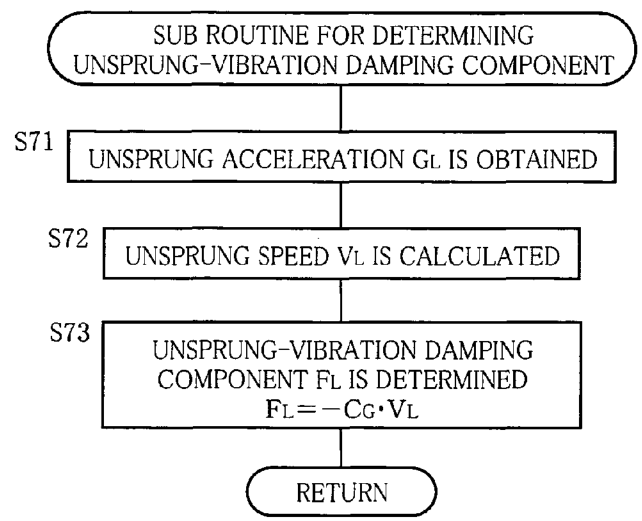
FIG. 18 is a flow chart of a sub routine for determining an unsprung-vibration damping component executed in the program of FIG. 17.

In the processing according to the actuator control program, step S101 is initially implemented to execute the sub routine for determining the sprung-vibration damping component indicated by the flow chart of FIG. 10. Subsequently, S102 is implemented to execute a sub routine for determining the unsprung-vibration damping component indicated by a flow chart of FIG. 18. S102 is followed by S103 in which is implemented the sub routine for determining the posture-change restrain component indicated by the flow chart of FIG. 11. Unlike the suspension system of the first embodiment, the suspension system in the present embodiment is configured to execute only one control as the relative-vibration damping control. Accordingly, after S103, the control flow goes to S104 to determine the relative-vibration damping component $F_{IA}$ according to the relative-vibration damping control set in the present system. In S104, there is implemented a sub routine substantially similar to the sub routine for determining the second relative-vibration damping component indicated by the flow chart of FIG. 13.

In the processing according to the above-indicated sub routines, there are respectively determined the sprung-vibration damping component $F_U$, the unsprung-vibration damping component $F_L$, the roll restrain component $F_R$ and the pitch restrain component $F_P$, and the corrected relative-vibration damping component $F_{IA}$ (which is obtained by correction of the relative-vibration damping component $F_I$), each as the component of the actuator force, according to the technique explained above.

After the components $F_U$, $F_L$, $F_R$, $F_P$, $F_{IA}$ have been determined, S105 is implemented to sum up the components $F_U$, $F_L$, $F_R$, $F_P$, $F_{IA}$, so that the synthetic actuator force F is determined. Subsequently, in S106, the command as to the duty ratio D is sent to the inverter 172 based on the determined actuator force F. After the processing in S106 is completed, one execution of the actuator control program is ended. As in the first embodiment, the processing in each of the steps that constitute the actuator control program and the sub routines can be easily understood by referring to the above explanation, and a detailed explanation of which is dispensed with.

(C) Functional Structure of Controller

Figure 19:
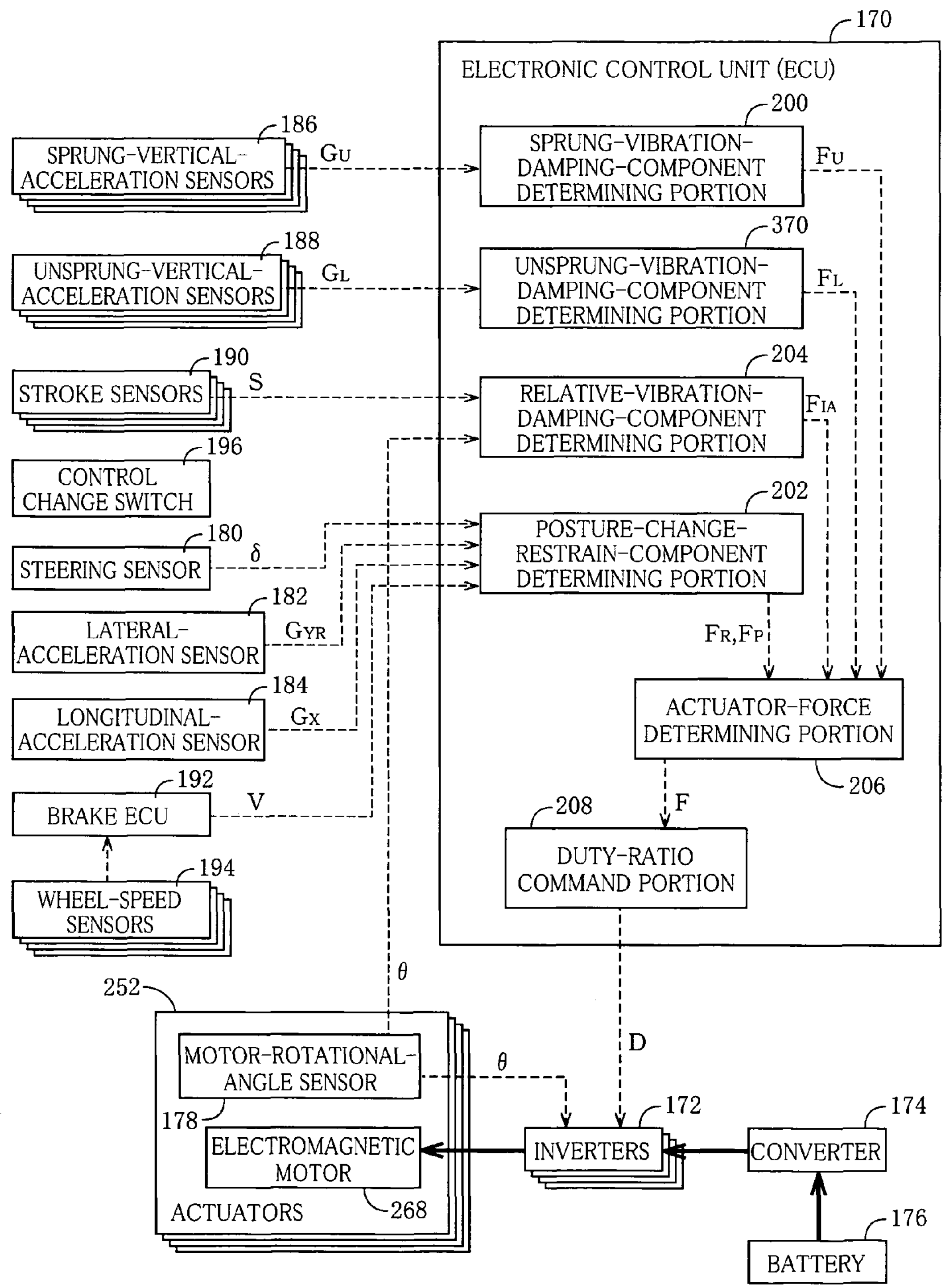
FIG. 19 is a block diagram showing a functional structure of a controller of the suspension system of FIG. 15.

The ECU 170 in the suspension system according to the present embodiment functions as a controller for controlling the actuator force to be generated by each of the electromagnetic actuators 252. The ECU 170 may be considered to have the functional structure shown in FIG. 19 in terms of the function of the ECU 170.

Like the ECU 170 in the first embodiment, the ECU 170 in the present embodiment includes the sprung-vibration-damping-component determining portion 200, the posture-change-restrain-component determining portion 202, and the relative-vibration-damping component determining portion 204. In addition, the ECU 170 includes an unsprung-vibration-damping-component determining portion 370 as a functional portion for determining the unsprung-vibration damping component $F_L$. The sprung-vibration-damping-component determining portion 200, the unsprung-vibration-damping-component determining portion 370, the posture-change-restrain-component determining portion 202, and the relative-vibration-damping-component determining portion 204 respectively correspond to portions of the ECU 170 that execute the processing in S101, the processing in S102, the processing in S103, and the processing in S104, respectively.

Like the ECU 170 in the first embodiment, the ECU 170 in the present embodiment further includes an actuator-force determining portion 206 as a portion that executes the processing in S105, namely, as a portion for determining the actuator force F to be generated by each actuator 252, by synthesizing the components $F_U$, $F_L$, $F_R$, $F_P$, $F_L$ ($F_{IA}$). In addition, the ECU 170 includes a duty-ratio command portion 208 as a portion that executes the processing in S106, namely, as a portion for sending the command as to the duty ratio D to the inverter 172 of the corresponding actuator 252, on the basis of the actuator force F.

According to the functional structure described above, the ECU 170 in the present embodiment may be considered to have the following four control portions for executing respective four controls: a sprung-vibration-damping control portion which includes the sprung-vibration-damping-component determining portion 200 and which executes the above-indicated sprung-vibration damping control; an unsprung-vibration-damping control portion which includes the unsprung-vibration-damping-component determining portion 370 and which executes the above-indicated unsprung-vibration damping control; a body-posture-change-restraining control portion which includes the posture-change-restrain-component determining portion 202 and which executes the above-indicated body-posture-change restraining control; and a relative-vibration-damping control portion which includes the relative-vibration-damping-component determining portion 204 and which executes the above-indicated relative-vibration damping control.

3. Other Embodiments

The suspension system in the illustrated second embodiment is configured to execute only the second relative-vibration damping control as the relative-vibration damping control. The suspension system in the second embodiment may be configured to execute the first relative-vibration damping control employed in the suspension system in the illustrated first embodiment, in place of the second relative-vibration damping control. Alternatively, the suspension system in the second embodiment may be configured to selectively execute the first relative-vibration damping control and the second relative-vibration damping control. On the other hand, the suspension system in the first embodiment may be configured to execute only one of the first and second relative-vibration damping controls.

Each of the suspension systems of the illustrated first and second embodiment is configured to execute the relative-vibration damping control only in a situation in which the vibration intensity component in the specific frequency range increases to a certain extent. The relative-vibration damping control may be executed at all times. Further, the relative-vibration damping control may be configured not to perform correction of the relative-vibration damping component $F_I$ based on the relative displacement amount W.

While the suspension system of the first embodiment is configured not to execute the unsprung-vibration damping control, the suspension system may be configured to execute the unsprung-vibration damping control. On the contrary, while the suspension system of the second embodiment is configured to execute the unsprung-vibration damping control, the suspension system may be configured not to execute the unsprung-vibration damping control.

Each of the suspension systems of the illustrated first and second embodiment is configured to restrain both of roll and pitch of the vehicle body in the body-posture-change restraining control. Each suspension system may be configured to restrain only one of the roll and the pitch of the vehicle body. Further, each suspension system may be configured not to execute the body-posture-change restraining control.

The suspension system of the first embodiment may be provided with a hydraulic damper configured to generate a resistance force against the relative movement of the sprung portion and the unsprung portion, namely, a damper similar to the damper 290 of the suspension system of the second embodiment, in place of or in addition to the hydraulic damper 52. On the contrary, the suspension system of the second embodiment may be provided with a hydraulic damper configured to generate a resistance force against the relative movement of the unsprung-side unit 284 and the unsprung portion, namely, a damper similar to the damper 52 of the suspension system of the first embodiment, in place of or in addition to the hydraulic damper 290.

In each of the suspension systems of the first and second embodiments, the unsprung-side unit is constituted as the floating unit. The suspension system according to the claimable invention may be a suspension system in which the sprung-side unit is constituted as the floating unit.

The invention claimed is:

1. A suspension system for a vehicle, comprising:

an electromagnetic actuator including:

(A) a sprung-side unit supported by a sprung portion;

(B) an unsprung-side unit which is supported by an unsprung portion and which moves relative to the sprung-side unit in association with a relative movement of the sprung portion and the unsprung portion toward and away from each other;

(C) a screw mechanism including a threaded rod and a nut which are screwed with each other and one of which is provided on the sprung-side unit while the other of which is provided on the unsprung-side unit, such that one of the threaded rod and the nut rotates relative to the other of the threaded rod and the nut in accordance with a relative movement of the sprung-side unit and the unsprung-side unit;

(D) an electromagnetic motor configured to give, the one of the threaded rod and the nut, a first force with respect to relative rotation of the threaded rod and nut, the actuator being configured to generate, based on the first force of the electromagnetic motor, an actuator force that is a second force with respect to the relative movement of the sprung-side unit and the unsprung-side unit;

a connecting mechanism which includes a support spring for permitting the unsprung-side unit to be floatingly supported as a floating unit by a unit-floatingly support portion that is the unsprung portion by which the unsprung-side unit is supported, the connecting mechanism being configured to connect, owing to an elastic force of the support spring, the unsprung-side unit and the unsprung portion to each other while permitting a relative movement thereof; and a controller configured to control the actuator force of the actuator by controlling an operation of the electromagnetic motor, wherein the controller includes:

a sprung-vibration-damping control portion configured to execute a sprung-vibration damping control for generating, as one component of the actuator force, a third force having a magnitude in accordance with a moving speed of the sprung portion, so as to damp a vibration of the sprung portion; and a relative-vibration-damping control portion configured to execute a relative-vibration damping control for generating, as one component of the actuator force, a fourth force having a magnitude in accordance with a relative moving speed of the unsprung-side unit and the unsprung portion, so as to damp a vibration of the unsprung-side unit which is caused by the structure in which the unsprung-side unit is supported by the support spring.

2. The suspension system according to claim 1, wherein the relative-vibration-damping control portion is configured to generate the fourth force having a magnitude in accordance with the relative moving speed of the unsprung-side unit and the unsprung portion, on the basis of a rotational speed of the electromagnetic motor and a relative moving speed of the sprung portion and the unsprung portion.

3. The suspension system according to claim 1, wherein the relative-vibration-damping control portion is configured to execute, as the relative-vibration damping control, a control for restraining resonance phenomenon of the unsprung-side unit which is caused by the structure in which the unsprung-side unit is floatingly supported by the support spring.

4. The suspension system according to claim 1, wherein the controller further includes an unsprung-vibration-damping control portion configured to execute an unsprung-vibration damping control for generating, as one component of the actuator force, a fifth force having a magnitude in accordance with a moving speed of the unsprung portion, for damping a vibration of the unsprung portion.

5. The suspension system according to claim 1, wherein the controller further includes a body-posture-change-restraining control portion configured to execute, for restraining at least one of pitch and roll of a body of the vehicle, a body-posture-change restraining control for generating, as one component of the actuator force, a counter force against an acting force that acts on the body of the vehicle as a cause of the at least one of pitch and roll, the counter force having magnitude in accordance with the acting force.

6. The suspension system according claim 1, comprising a main spring configured to connect, owing to an elastic force thereof, the sprung portion and the unsprung portion.

7. The suspension system according to claim 1, comprising a connect spring configured to connect, owing to an elastic force thereof, the unsprung-side unit and the sprung portion by which the sprung-side unit is supported.

8. The suspension system according to claim 1, further comprising a hydraulic damper configured to generate a counter force against the relative movement of the sprung portion and the unsprung portion.

9. The suspension system according to claim 1, wherein the connecting mechanism includes a hydraulic damper configured to generate a counter force against the relative movement of the unsprung-side unit and the unsprung portion.

10. The suspension system according to claim 1, wherein the relative-vibration-damping control portion is configured to execute the relative-vibration damping control only in a situation in which a component of an intensity of the vibration of the unsprung-side unit with respect to a specific frequency is higher than a threshold.

11. The suspension system according to claim 10, wherein the relative-vibration-damping control portion is configured to execute, as the relative-vibration damping control, a control for restraining resonance phenomenon of the unsprung-side unit which is caused by the structure in which the unsprung-side unit is floatingly supported by the support spring and is configured to execute the control only in a situation in which a component of the intensity of the vibration of the unsprung-side unit with respect to a resonance frequency in the resonance phenomenon as the specific frequency is higher than the threshold.

12. The suspension system according to claim 1, further comprising a relative-displacement limiting mechanism configured to limit a relative displacement of the unsprung-side unit and the unsprung portion in the relative movement thereof.

13. The suspension system according to claim 12, wherein the relative-vibration-damping control portion is configured such that a control gain set for the fourth force to be generated by the actuator in the relative-vibration damping control is made larger in an instance where an amount of the relative displacement of the unsprung-side unit and the unsprung portion in the relative movement thereof exceeds a threshold than an instance where the amount of the relative displacement does not exceed the threshold.

14. The suspension system according to claim 12, wherein the relative-vibration-damping control portion is configured such that a control gain set for the fourth force to be generated by the actuator in the relative-vibration damping control increases with an increase in an amount of the relative displacement of the unsprung-side unit and the unsprung portion in the relative movement thereof.

* * * * *